(12) United States Patent
Strand et al.

(10) Patent No.: US 11,759,746 B2
(45) Date of Patent: Sep. 19, 2023

(54) MASS TRANSFER SYSTEMS

(71) Applicant: FJELL BIODRY AS, Straume (NO)

(72) Inventors: Asbjørn Strand, Bergen (NO); Kumar Ranjan Rout, Trondheim (NO); De Chen, Trondheim (NO)

(73) Assignee: FJELL BIODRY AS, Straume (NO)

( * ) Notice: Subject to any disclaimer, the term of this patent is extended or adjusted under 35 U.S.C. 154(b) by 400 days.

(21) Appl. No.: 16/954,172

(22) PCT Filed: Dec. 17, 2018

(86) PCT No.: PCT/EP2018/085300
§ 371 (c)(1),
(2) Date: Jun. 15, 2020

(87) PCT Pub. No.: WO2019/115831
PCT Pub. Date: Jun. 20, 2019

(65) Prior Publication Data
US 2021/0093993 A1   Apr. 1, 2021

(30) Foreign Application Priority Data

Dec. 15, 2017 (GB) ........................................ 1721034
Oct. 19, 2018 (GB) ........................................ 1817072

(51) Int. Cl.
*B01D 53/08* (2006.01)
*B01D 53/62* (2006.01)
(Continued)

(52) U.S. Cl.
CPC ............. *B01D 53/08* (2013.01); *B01D 53/62* (2013.01); *B01D 53/83* (2013.01); *B01D 53/96* (2013.01);
(Continued)

(58) Field of Classification Search
CPC ........ B01D 53/08; B01D 53/62; B01D 53/83; B01D 53/96; B01D 2251/606;
(Continued)

(56) References Cited

U.S. PATENT DOCUMENTS 2,780,310 A * 2/1957 Schaub .................... C10K 1/20
95/110
4,133,659 A   1/1979 Beckman
(Continued)

FOREIGN PATENT DOCUMENTS

CN    107051117 A    8/2017
GB    1 558 074 A   12/1979
(Continued)

OTHER PUBLICATIONS

GB Combined Search and Examination Report under Sections 17 and 18(3), dated Jan. 22, 2018, issued in GB Application No. 1721034.5, filed Dec. 15, 2017, 25 pages.
(Continued)

*Primary Examiner* — Frank M Lawrence, Jr.
(74) *Attorney, Agent, or Firm* — Christensen O'Connor Johnson Kindness PLLC

(57) ABSTRACT

Disclosed herein is a gas capture system that includes a gas inlet arranged to receive a gas flow into the system; a gas outlet arranged to provide a gas flow out of the system; a gas capture region for mass transfer between a gas and a sorbent of the gas; and a sorbent regeneration region for regenerating the sorbent by heating the sorbent so that the sorbent releases a gas.

18 Claims, 17 Drawing Sheets

(51) Int. Cl.
  *B01D 53/83* (2006.01)
  *B01D 53/96* (2006.01)

(52) U.S. Cl.
  CPC .......... *B01D 2251/606* (2013.01); *B01D 2253/1124* (2013.01); *B01D 2255/2045* (2013.01); *B01D 2257/504* (2013.01); *B01D 2259/402* (2013.01); *B01D 2259/4009* (2013.01)

(58) Field of Classification Search
  CPC ...... B01D 2253/1124; B01D 2253/112; B01D 2255/2045; B01D 2257/504; B01D 2259/4009; B01D 2259/402
  USPC ..... 95/107, 110, 111, 114, 115, 139; 96/122, 96/123, 130, 139, 143, 144, 150, 152
  See application file for complete search history.

(56) References Cited

U.S. PATENT DOCUMENTS

| | | | |
|---|---|---|---|
| 4,147,523 A | 4/1979 | Izumo | |
| 4,725,290 A * | 2/1988 | Ohlmeyer | B01D 46/34 55/482 |
| 7,896,951 B2 * | 3/2011 | Andrus, Jr. | B01D 53/62 95/107 |
| 2006/0230930 A1 * | 10/2006 | Knaebel | B01D 53/0462 95/96 |
| 2014/0112856 A1 | 4/2014 | Krutka et al. | |
| 2015/0007725 A1 | 1/2015 | Elliott et al. | |
| 2017/0197174 A1 | 7/2017 | Nishibe et al. | |
| 2019/0046920 A1 * | 2/2019 | Nishibe | B01D 53/14 |

FOREIGN PATENT DOCUMENTS

| | | |
|---|---|---|
| JP | 53-43680 A | 4/1978 |
| WO | 94/01203 A1 | 1/1994 |
| WO | 2016/074980 A1 | 5/2016 |
| WO | 2017/062526 A1 | 4/2017 |

OTHER PUBLICATIONS

International Search Report dated Apr. 1, 2019, issued in corresponding International Application No. PCT/EP2018/085300, filed Dec. 17, 2018, 4 pages.
International Preliminary Report on Patentability dated Jun. 16, 2020, issued in corresponding International Application No. PCT/EP2018/085300, filed Dec. 17, 2018, 8 pages.

* cited by examiner

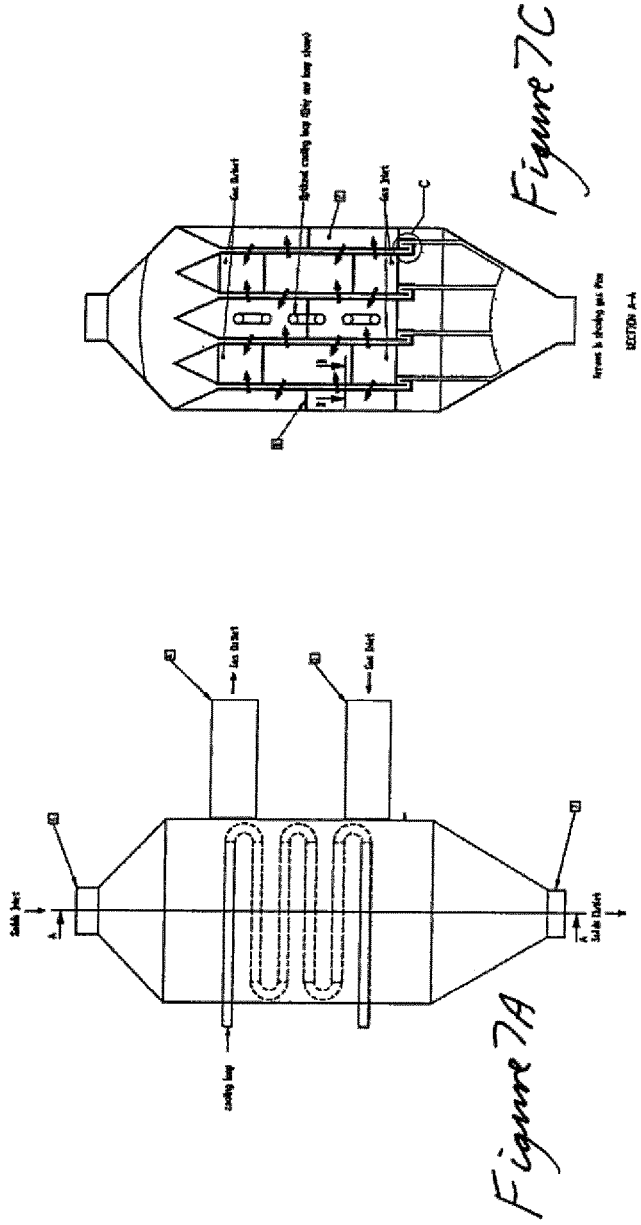
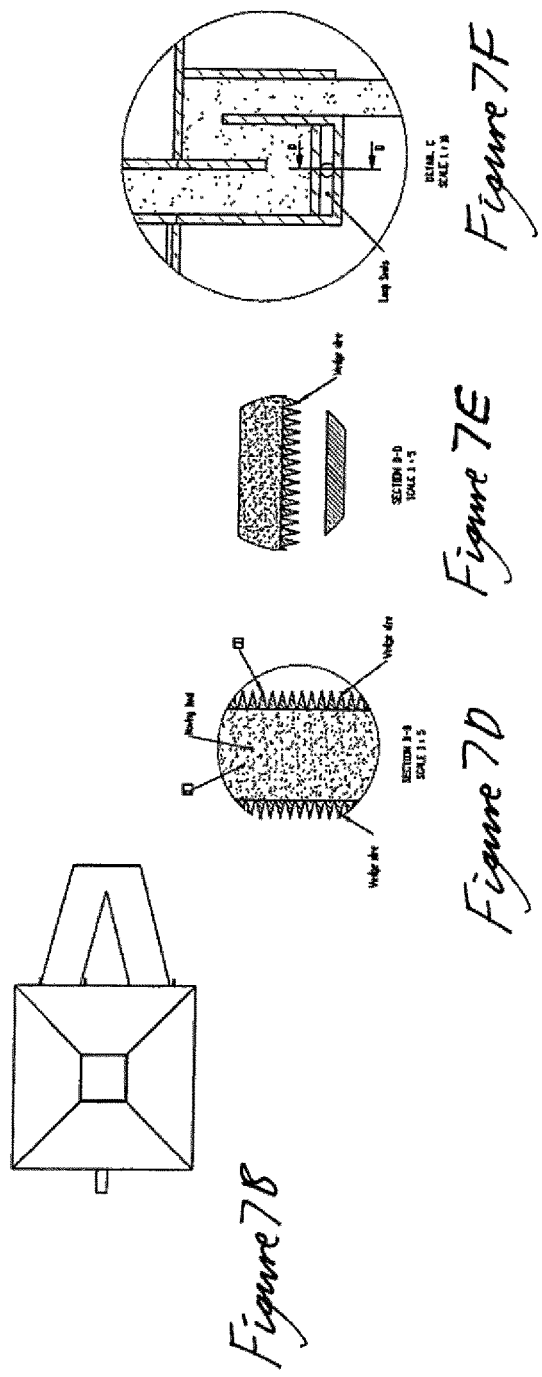

MASS TRANSFER SYSTEMS

FIELD

The field of the invention is the design of reactors for reactions between a gas and a solid as well as reactors for supporting the release of gas from a solid. Embodiments provide new reactor designs with a number of advantages over known reactor designs.

BACKGROUND

Fossil fuels provide a significant portion of the world's energy needs. A problem with fossil fuel combustion is that it is a major source of anthropogenic carbon dioxide ($CO_2$) emissions.

A known technology for reducing $CO_2$ emissions into the atmosphere is carbon capture and storage (CCS). The three main options for capturing $CO_2$ from fossil fuel plants are post-combustion, pre-combustion, and oxy-combustion. An important advantage of post-combustion technologies is that the technology can be retro-fitted to existing power plants.

In a CCS system, a sorbent removes $CO_2$ from a carbonaceous gas. The CCS system also comprises a sorbent regenerator in which the sorbent releases $CO_2$ into a controlled environment so that the $CO_2$ is not released into the atmosphere. The regenerated sorbent is then re-used to remove $CO_2$ from gas. The sorbent is therefore moved around the CCS system in a loop.

The sorbent used for post combustion $CO_2$ capture can either be any of a number of commercially available aqueous amine solvents or a sorbent based adsorption technology. An advantage of absorption processes that use amine solvents is the fast kinetics in the absorption reactor. However, disadvantages include high capital and operating costs. The use of amine solvents can also cause environmental problems. The use of solid sorbents for CCS has a number of technical and economic advantages over the use of amine solvents. An example of a solid sorbent for CCS is calcium oxide (CaO).

For realisation of a solid sorbent based CCS system, a gas-solid reactor is required for supporting the reaction between a solid sorbent and carbonaceous gas, e.g. a flue gas from a fossil fuel power plant. Three types of beds are typically used in gas-solid reactors. These are fixed beds, fluidized beds, and moving beds.

When reactors with fixed beds are used in a system that is operated continuously, the reactors require complicated operation and control procedures in which the bed is alternatively saturated and regenerated in a cyclical manner. Another problem with fixed bed reactors, in the specific application of CCS applied to flue gas from fossil fuel fired plant with a CaO sorbent, is that the volume of flue gas is three orders of magnitude larger than the optimum volume flow of solid particles. Due to limitations on gas velocity to prevent the bed from fluidizing, a large number of fixed beds are needed and this greatly increases the capital cost.

A fluidised bed of a reactor is a bubbling and circulating bed in which solids and gas are well mixed. The mixing ensures good heat and mass transfer characteristics. The fluidized bed reactor is an effective mixing device for solid particles due to the large flows inside the reactor. However, a problem with fluidised bed reactors is that the retention time of individual solid particles has a very wide probability distribution. Some particles can stay in the reactor for seconds, whereas other particles may stay in the reactor for minutes. When the optimum retention time for the reaction is in the order of a few minutes, a significant proportion of the solids will be in the reactor for too short a time for the reaction to be effectively completed, and another significant proportion will still be in the reactor long after reaction is completed. This reduces the efficiency of fluidized bed reactors and reduces their economic viability. Another problem with the use of fluidized bed reactors is that there can be significant attrition of sorbent particles and erosion of the reactor vessel and internal components.

In known designs of moving bed reactor, a solid particles are contained in a vertically oriented reactor chamber. Solid particles are continuously fed into the top of the reactor and taken out from the bottom of the reactor in a controlled manner. By the act of gravity, the solid bed inside the reactor moves from the top of the reactor to the bottom of the reactor as a plug. This secures a specific retention time of solid particle passing through the reactor. The solid particles are fairly densely packed in the moving bed, leaving a relatively small volume for the gas phase. Gaseous reactants can pass through the reactor in a co-flow, counter flow or cross flow manner. Known designs of moving bed reactor are problematic when the gas has a relatively low concentration of reactants such that there is a large proportion of inert gas inside the reactor that needs to be transported through the solid bed. This creates large pressure drops in the gas phase, and in the case of counter flowing gas, the gas may quickly start to fluidize the solid bed so that the system does not possess the characteristics of a moving bed reactor.

There is a general need to provide an efficient reactor for use in large scale CCS applications. More generally, there is a need to provide an efficient reactor for other mass transfer applications. In particular, there is a need to provide an efficient reactor for the use of a sorbent to separate $CO_2$ and $H_2$, as may be required when $H_2$ is generated by reforming processes.

SUMMARY OF INVENTION

According to a first aspect of the invention, there is provided a gas capture system comprising: a gas inlet arranged to receive a gas flow into the system; a gas outlet arranged to provide a gas flow out of the system; a gas capture region for mass transfer between a gas and a sorbent of the gas; and a sorbent regeneration region for regenerating the sorbent by heating the sorbent so that the sorbent releases a gas; wherein: the gas capture region is arranged to receive sorbent from the sorbent regeneration region; the sorbent regeneration region is arranged to receive sorbent for regeneration from the gas capture region; the sorbent is a solid sorbent of carbon dioxide gas; and the gas capture region comprises: a sorbent inlet arranged to receive an input of sorbent into the gas capture region; a sorbent outlet arranged to provide an output of sorbent from the gas capture region; one or more mass transfer regions arranged between the sorbent inlet and the sorbent outlet such that, in use, the sorbent is retained within the one or more mass transfer regions as the sorbent moves through the mass transfer regions and the mass transfer between the gas and the sorbent occurs in the one or more mass transfer regions; a first gas chamber; and a second gas chamber, that is different from the first gas chamber; wherein the first gas chamber, second gas chamber and one or more mass transfer regions are arranged such that, in use, there is a flow path for gas that comprises gas flowing from the first gas chamber into one of the one or more mass transfer regions, the gas then flowing from said one of the mass transfer regions into the second gas chamber and the gas then flowing from the second gas chamber back into said one of the mass transfer regions.

Preferably, the sorbent regeneration region comprises: a sorbent inlet arranged to receive an input of sorbent for regeneration; a sorbent outlet arranged to provide an output of regenerated sorbent; one or more mass transfer regions arranged between the sorbent inlet and the sorbent outlet such that, in use, the sorbent is retained within the one or more mass transfer regions as the sorbent moves through the mass transfer regions and, in use, heating the sorbent to generate a gas occurs in the one or more mass transfer regions; a first gas chamber; and a second gas chamber, that is different from the first gas chamber; wherein the first gas chamber, second gas chamber and one or more mass transfer regions are arranged such that, in use, there is a flow path for gas from the gas inlet to the gas outlet that comprises gas flowing from the first gas chamber into one of the one or more mass transfer regions, the gas then flowing from said one of the mass transfer regions into the second gas chamber and the gas then flowing from the second gas chamber back into said one of the mass transfer regions.

Preferably: the number of mass transfer regions in the gas capture region is the same as the number of mass transfer regions in the sorbent regeneration region; there are a plurality of mass transfer regions; and the number of mass transfer regions is optionally between 2 and 20.

Preferably: the gas capture region and/or the sorbent regeneration region are provided by one or more substantially cuboid reactors; and one or more of the mass transfer regions are substantially cuboid.

Preferably: each mass transfer region is a moving bed; and each mass transfer region is arranged such that, in use, the flow path of the sorbent through each mass transfer region is vertically downwards.

Preferably, one or more of the mass transfer regions comprises sidewalls that separate the mass transfer region from a gas chamber; wherein each of the sidewalls is configured such that, in use, gas is able to flow through the sidewall and substantially no sorbent can pass through the sidewall.

Preferably: one or more gas ducts are provided between each two adjacent mass transfer regions; each of the one or more gas ducts comprises a plurality of gas chambers, wherein the gas chambers in each of the one or more gas ducts are separated by one or more baffle plates that gas is unable to flow through; and the gas chambers in each gas duct are aligned vertically, with vertically adjacent gas chambers separated by a substantially horizontal baffle plate.

Preferably, gas capture system further comprises a flow control mechanism at an end of each mass transfer region for controlling the rate at which sorbent can move through the mass transfer region.

Preferably, the gas capture region comprises cooling tubes in one or more of the gas chambers; and, in use, the cooling tubes are arranged to cool gas in the gas chambers.

Preferably, the sorbent regeneration region comprises a heat source for supplying heat to the sorbent regeneration region.

Preferably, the heat source in the sorbent regeneration region receives heat from a heat source that is external from the gas capture system; wherein the heat source that is external from the mass transfer system is optionally a catalytic combustor, preferably a catalytic total combustor.

Preferably, the gas capture system comprises: a heating region comprising a heating system for heating sorbent in the heating region, one or more moving beds, one or more gas inlets, one or more gas outlets and one or more gas chambers, wherein, in use, the sorbent is retained within the one or more moving beds of the heating region when the sorbent moves between the sorbent outlet of the gas capture region and the sorbent inlet of the sorbent regeneration region; and a cooling region comprising a cooling system for cooling sorbent in the cooling region, one or more moving beds, one or more gas inlets, one or more gas outlets and one or more gas chambers, wherein, in use, the one or more moving beds of the cooling region receive the sorbent output from the sorbent outlet of the sorbent regeneration region and, when in the cooling region, the sorbent is retained within the moving beds of the cooling region.

Preferably, the gas capture system further comprises: one or more heat loops; wherein the heating system comprises a first part of each heat loop arranged in one of the one or more gas chambers of the heating region; and wherein the cooling system comprises a second part of each heat loop arranged in one of the one or more gas chambers of the cooling region.

Preferably, the gas capture system further comprises a gas circulation system, wherein the gas circulation system is arranged to: supply gas output from the gas outlet of the heating region to the gas inlet of the cooling region; and supply gas output from the gas outlet of the cooling region to the gas inlet of the heating region.

Preferably, the gas capture system further comprises a first gas circulation system and a second gas circulation system, wherein: the first gas circulation system is arranged to supply gas output from the gas outlet of the heating region to the gas inlet of the heating region; and the second gas circulation supply gas output from the gas outlet of the cooling region to the gas inlet of the cooling region.

Preferably, the gas circulated in each gas circulation system for a heating and/or cooling region comprises one or more of air, nitrogen, clean flue gas, hydrogen and an inert gas.

Preferably, the gas system according to any preceding claim, further comprising a gas circulation system for gas in the sorbent regeneration region, wherein the gas circulation system is arranged to: supply gas output from a gas outlet of the sorbent regeneration region to a gas inlet of the sorbent regeneration region.

Preferably, the gas circulated by the gas circulation system for the sorbent regeneration region is substantially pure carbon dioxide.

Preferably, the gas capture region, heating region, sorbent regeneration region and cooling region are comprised by different parts of a single reactor.

Preferably, the gas capture region is comprised by a first reactor; and the heating region, sorbent regeneration region and cooling region are comprised by second reactor.

Preferably, any two, any three or all of the gas capture region, heating region, sorbent regeneration region and cooling region are comprised by different reactors.

Preferably, the gas capture system further comprises: a first barrier that substantially prevents direct gas flow from a gas chamber in the gas capture region to a gas chamber in the heating region; a second barrier that substantially prevents direct gas flow from a gas chamber in the heating region to a gas chamber in the sorbent regeneration region; and a third barrier that substantially prevents direct gas flow from a gas chamber in the sorbent regeneration region to a gas chamber in the cooling region.

Preferably, in use, the gas supplied through the a gas inlet of the gas capture system comprises $CH_4$ and $H_2O$; and a sorption enhanced reforming process is performed in the gas capture region.

Preferably, in use, a sorption enhanced water gas shift process is performed in the gas capture region.

Preferably, the gas capture region comprises: a first region in which a sorption enhanced reforming process is performed; a second region in which a sorption enhanced water gas shift process is performed; and one or more pipes for cooling sorbent; wherein: the first region comprises the gas inlet of the gas capture region; the second region comprises the gas outlet of the gas capture region; the one or more pipes for cooling sorbent are arranged between the first region and the second region.

Preferably, the one or more pipes for cooling sorbent are part of a heat exchanger arranged to transfer heat between the heating region and the gas capture region.

Preferably, in use, the gas capture region comprises a catalyst for accelerating the sorption enhanced reforming process and/or the sorption enhanced water gas shift process.

Preferably, in use: particles are circulated around the gas capture system with each particle comprising both the catalyst and the sorbent; separate particles of sorbent and catalyst are circulated around the gas capture system; and/or a fixed bed of catalyst is provided in the gas capture region.

Preferably, the sorbent comprises a metal carbonate, such as calcium carbonate; and in use, the gas captured in the gas capture region is carbon dioxide.

According to a second aspect of the invention, there is provided a power generation system comprising: a power plant arranged to generate power by combusting a carbonaceous fuel; and the gas capture system according to the first aspect; wherein the gas capture system is arranged to receive flue gas output from the power plant and remove carbon dioxide from the flue gas.

Preferably, the power plant is a natural gas combined cycle plant.

Preferably, the power plant further comprises a heat exchanger for using heat generated in gas capture system to pre-heat air used in the power plant.

According to a third aspect of the invention, there is provided a method of separating a gas from a gas mixture, the method comprising: receiving a gas mixture by a gas capture system according to the first aspect; and using the gas capture system to remove a gas from the gas mixture.

LIST OF FIGURES

FIG. 7A is a cross-section through a reactor design according to an embodiment;

FIG. 7B is a top down view of a reactor design according to an embodiment;

FIG. 7C is a cross-section through a reactor design according to an embodiment;

FIG. 7D is a cross-section through a moving bed of a reactor design according to an embodiment;

FIG. 7E is a cross-section through part of a flow control mechanism according to an embodiment;

FIG. 7F is a cross-section through a loop valve of a reactor design according to an embodiment;

DESCRIPTION OF EMBODIMENTS

Figure 1:
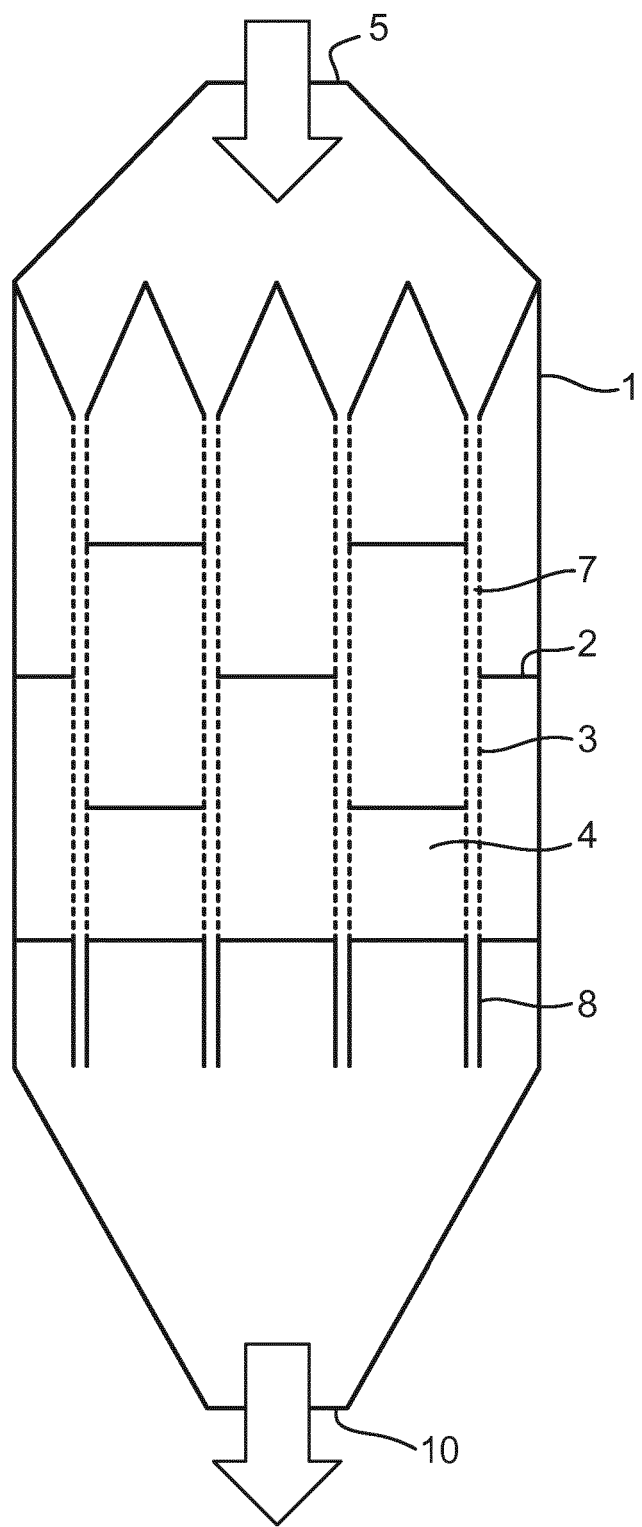
FIG. 1 is a cross-section through a reactor design according to an embodiment.
Figure 2:
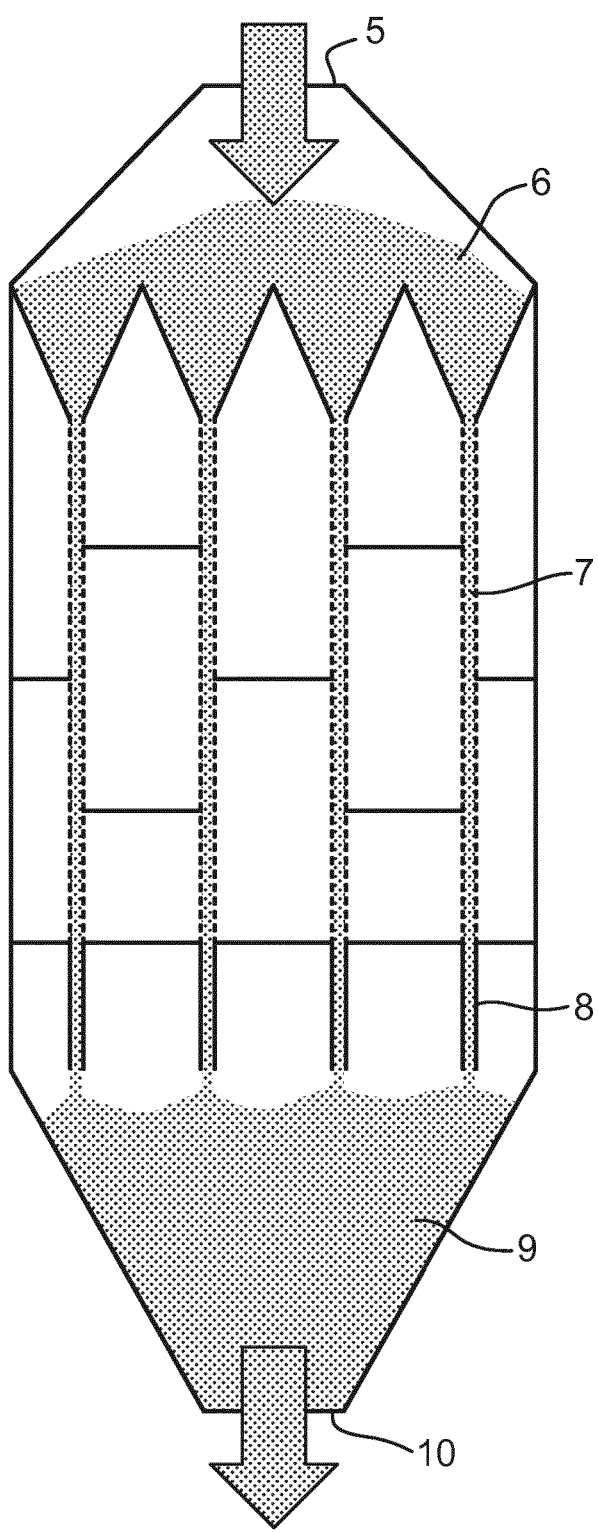
FIG. 2 is a cross-section through a reactor design according to an embodiment.

According to a first embodiment, there is provided a first reactor for supporting a reaction between a sorbent and a gas.

According to a second embodiment, there is provided a second reactor for supporting a reaction in which a sorbent is regenerated.

According to a third embodiment, there is provided a system comprising the reactors of the first and second embodiments.

According to a fourth embodiment, there is provided another system comprising the reactors of the first and second embodiments.

According to a fifth embodiment, there is provided a system for supporting a sorption enhanced reforming process, and optionally a sorption enhanced water gas shift process, in addition to a gas capture process.

A preferred application of embodiments is in a CCS system for large scale CCS applications. The CCS system preferably uses metal oxide particles/pellets, such as calcium oxide (CaO) particles/pellets, as a sorbent. The sorbent preferably continuously moves around the CCS system in a loop with the sorbent being used to capture a gas and then being regenerated with each loop of the system.

In the application of $CO_2$ capture from flue gas from a natural gas fired combined cycle power plant (NGCC), the concentration of reactant is less than 4% vol. A typical 400 MW class NGCC produces nearly 2000 $m^3$/s exhaust from the gas turbine. To capture the $CO_2$ by carbonate looping in a moving bed reactor requires a flow of approximately 400 kg/s of CaO particles. Effective CaO particles would need to be in the form of substantially spherical pellets of diameter 1 mm to 3 mm having a bulk density of about 1000 $kg/m^3$. This results in a volume flow of circulating solids of 0.4 $m^3$/s. An acceptable utilization of the CaO pellets requires a retention time in the reactor of approximately 3 minutes. That implies a bulk volume of the solid pellets bed of 72 $m^3$. It is clearly not possible to pass 2000 $m^3$/s exhaust gas through a known design of moving bed of such volume without causing extreme pressure drops or fluidization of the bed.

For a coal fired power plant, the $CO_2$ concentration in the gas may be 12-14% vol. Flue gases from industrial process like a blast furnace for steel production or a cement kiln can have concentrations of $CO_2$ above 20%. However, the inert gas volume left after the $CO_2$ has reacted with the solids has practically the same volume. Known moving bed reactor designs therefore experience similar problems to those described above.

Embodiments solve the above problems by providing new designs of reactors for supporting gas-solid reactions and the release of gas from a solid in a CCS system. Each reactor comprises a plurality of moving beds for transporting solid sorbent through the reactor. Each reactor also comprises a plurality of gas ducts for gas flows through the reactor. The gas flows are controlled such that gas is forced to flow across one or more moving beds a plurality of times.

A particularly preferred application of a reactor according to an embodiment is supporting the reaction between a solid sorbent and a carbonaceous gas in a CCS system. The sorbent is preferably CaO particles in the form of substantially spherical pellets/particles with a 1 mm to 3 mm diameter and a bulk density of up to 3000 kg/m$^3$, preferably the bulk density is in the range 1000 to 1500 kg/m$^3$.

Embodiments also include other applications for reactors, such as reactors for gas reforming and/or the removal of $CO_2$ from a mixture of $H_2$ and $CO_2$.

A first embodiment is described in more detail below.

FIGS. 1 to 6, 7A and 7C show cross-sections through a first reactor according to a first embodiment. FIG. 7B is a top down view of the first reactor. As shown in FIGS. 1 to 6, 7A and 7C, at the top of the first reactor is an inlet 5 through which sorbent enters the first reactor. At the bottom of the first reactor is an outlet 10 through which the sorbent exits the first reactor. Between the inlet 5 and the outlet 10 is a main body of the first reactor.

The main body of the first reactor has outer walls 1. At the top of the main body of the first reactor is an upper bed 6. Provided below the upper bed 6 are a plurality of moving beds 7 that extend vertically downwards through the main body of the first reactor to a lower bed 9 at the bottom of the first reactor. The main body of the first reactor also comprises a gas inlet 14, through which gas enters the first reactor, and a gas outlet 13, through which gas exits the first reactor. Between the vertically arranged moving beds 7, as well as the outer walls 1 of the main body, are gas ducts for gas flows through chambers in the main body.

The walls of the moving beds 7 comprise strainer plates 3. The strainer plates 3 have the property of retaining the solid sorbent within each moving bed 7 but gas is able to pass through the strainer plates 3. A possible design of the strainer plate 3 may be types wedge wire screens, such as those manufactured by Intamesh, see http://www.intamesh-.co.uk/ as viewed on 13 Dec. 2017. It is known to use such screens as strainers and filters in other industries than the field of embodiments, such as in shale shakers for mud and cuttings separation during the drilling of oil and gas wells. FIG. 7D is a cross-section through a moving bed 7 with wedge wire screens as walls according to an embodiment.

In order to minimise the friction and stress on the particles of sorbent, the strainer plates 3 are preferably orientated vertically. That is to say, the gap between the plates is linear and orientated so that it is parallel to the flow of sorbent through the first reactor. For the same reason, when the strainer plate 3 is a wedge wire screen, the flat side of the wedge should provide the inner surface of the outer wall of the moving beds 7, as shown in FIG. 7D. The wedge should have the property that the openings in the wedge are not so large that particles of the sorbent can pass through the openings, but the openings should be large enough to allow gas to pass through them. The diameter of the sorbent particles/pellets may be about 1 mm to 3 mm and so an appropriate opening distance in the wedge wire screen may be between 0.2 mm to 0.8 mm, preferably 0.5 mm. The width of the flat side of the wedge that provides the inner surface of the outer wall of the moving beds 7, as shown in FIG. 7D, may be 1.5 mm.

The first reactor is designed so that it can be used with any size of sorbent. The openings in the wedge are always designed to be smaller than the diameter of all, or substantially all, the particles of the sorbent so the particles cannot pass through the openings. For example, if the particles of the sorbent have a diameter of 0.5 mm the openings in the wedge may be reduced to 0.3 mm.

Alternatively, the strainer plates 3 may be provided by perforated plates, or a thick rigid perforated plate with fairly large diameter perforation (approx. 10 mm) cladded with a thin sheet with very small perforation (<1 mm). In some applications these may be sufficient for retaining particles of solid sorbent in the moving beds 7 and less expensive than wedge wire screens.

The gas ducts comprise horizontally arranged baffle plates 2 and gas is unable to flow directly through a baffle plate 2. Preferably there is at least one baffle plate 2 in each gas duct 4. The provision of one or more baffle plates 2 in each vertically aligned gas duct divides each gas duct into a plurality of separate and vertically aligned chambers.

Figure 6:
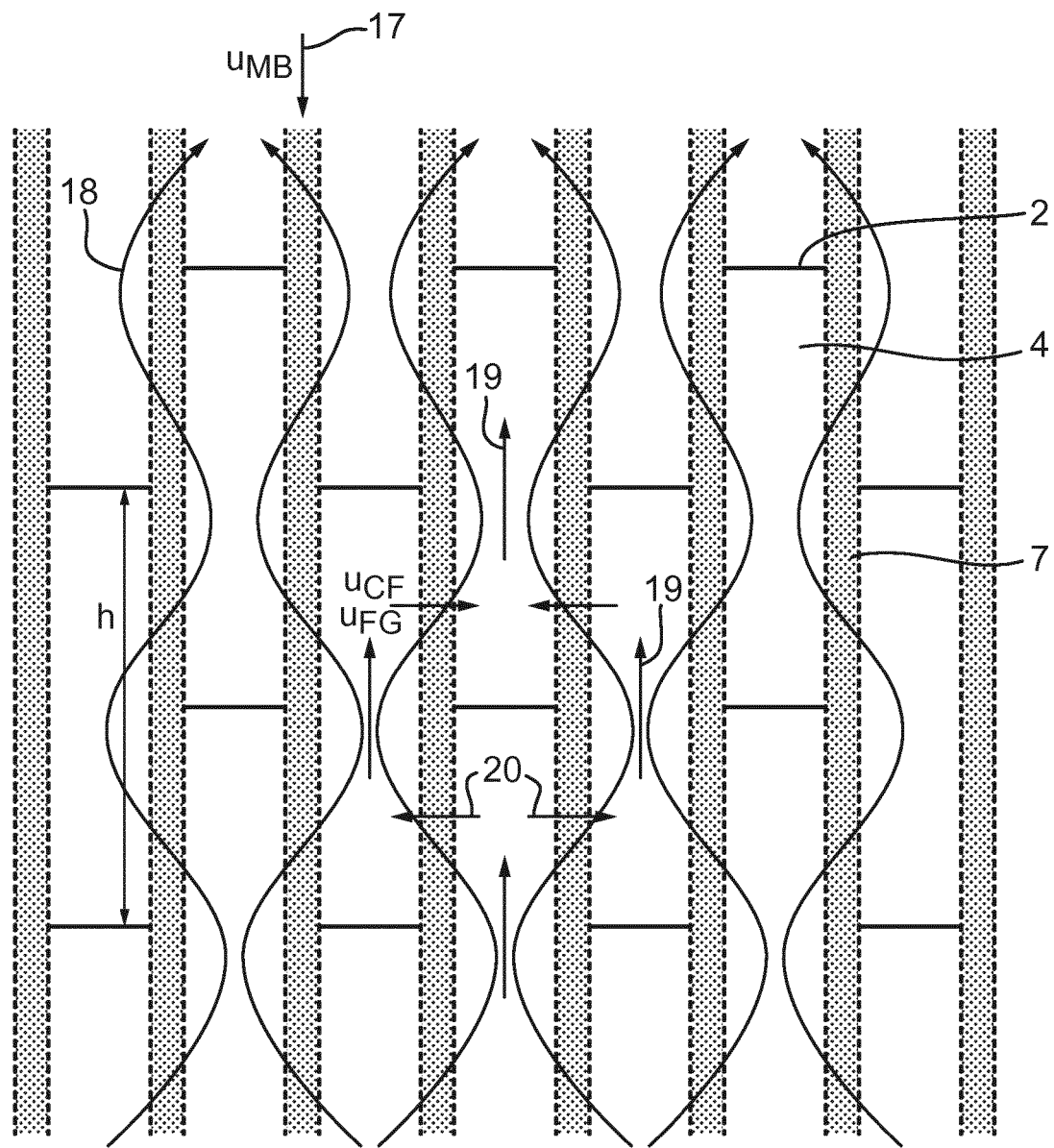
FIG. 6 is a cross-section through a reactor design according to an embodiment.

As shown in FIG. 6, when a gas flow in a gas duct 4 reaches a baffle plate 2, the gas is forced by the baffle plate 2 to flow out of its current chamber in the gas duct, through a strainer plate 3 and into a moving bed 7. The gas then flows across the moving bed 7 and into a chamber of a different gas duct. In order for it to be possible for gas to flow from a chamber in a first gas duct 4 to an adjacent chamber in the same first gas duct, via a chamber in a second gas duct, the vertical position of baffle plates 2 in adjacent gas ducts is preferably staggered as shown in FIG. 6. That is to say, in any two adjacent gas ducts 4, all of the baffle pates 2 have different vertical positions. As shown in FIG. 6, a gas path through the first reactor may comprise flowing across the same moving bed 7 plurality of times. Clearly, a gas flow path through the first reactor may additionally, or alternatively, comprise flowing across a plurality of different moving beds 7.

The gas flow paths from the gas inlet 14 to the gas outlet 13 therefore comprise gas flows through a plurality of chambers, with the gas flowing through one of the moving beds 7 whenever it flows between two chambers.

Preferably, the main body of the first reactor is substantially a rectangular cuboid. Each of the moving beds 7, gas ducts and chambers in each gas duct are also substantially rectangular cuboids. Two walls of each moving bed 7 are provided by strainer plates 3, two further walls of each moving bed 7 are provided by parts of the outer wall 1 of the main body and the moving beds 7 are open at each end in order for sorbent to enter and exit the moving bed 7. Each gas duct is also cuboid and is either formed between two moving beds 7 or between a moving bed 7 and the outer wall 1 of the main body. The baffle plates 2 in the gas ducts are also thin rectangular cuboids. Advantageously, the components of the main body of the first reactor all have a rectangular cuboid construction and can therefore be easily made. The construction of the first reactor is also easier when rectangular cuboid components are used.

Although the main body of the first reactor is preferably rectangular cuboid, embodiments also include the first reactor being cylindrical, as well as other shapes.

According to a preferred embodiment, the rate at which sorbent passes through the moving beds 7 can be controlled. At the lower end of each of the moving beds 7 is an exit duct 8. Each of the exit ducts 8 comprises a flow control mechanism. The flow control mechanism may comprise, for example, one or more loop seals, as shown in FIG. 7F, and/or one or more adjustable baffles, as shown in FIG. 7E, and allows the rate at which the sorbent moves into the lower bed 9 to be controlled. Preferably, some of the gas is fed into a gas inlet of the loop seal. This generates an up-flow of gas that reduces that rate at which sorbent particles move through the moving beds. The flow control mechanism through the first reactor may also be as described later with reference to FIGS. 11A to 11D.

The reaction between a carbonaceous gas and CaO is an exothermic reaction. It is therefore necessary to remove heat from the first reactor in order to maintain the conditions of the reaction between the gas and the sorbent within a desired temperature range over a long period of use, or continuous use, of the first reactor. In order to remove heat for the first reactor, the first reactor preferably comprises one or more cooling tubes 12. As shown in FIGS. 4, 5, 7A and 7C, a cooling tube 2 has an inlet 15 into the first reactor and outlet 16 from the first reactor. The cooling tube 2 is arranged to pass the through one or more of the gas ducts. Embodiments include there being one or more cooling tubes 12 for each chamber of a gas duct, one or more cooling tubes 12 for each gas duct or one or more cooling tubes 12 for all of the gas ducts. The cooling tubes are arranged to directly cool the gas in order to remove heat from the system. Since the cooling tubes 12 do not pass through the moving beds 7 they do not impede the movement of the sorbent in the moving beds 7. Within each cooling tube is a circulated coolant in a heat exchanger arrangement according to known techniques. The coolant may be, for example, one of the noble elements (such as Helium), sodium or any other suitable working fluid.

Figure 3:
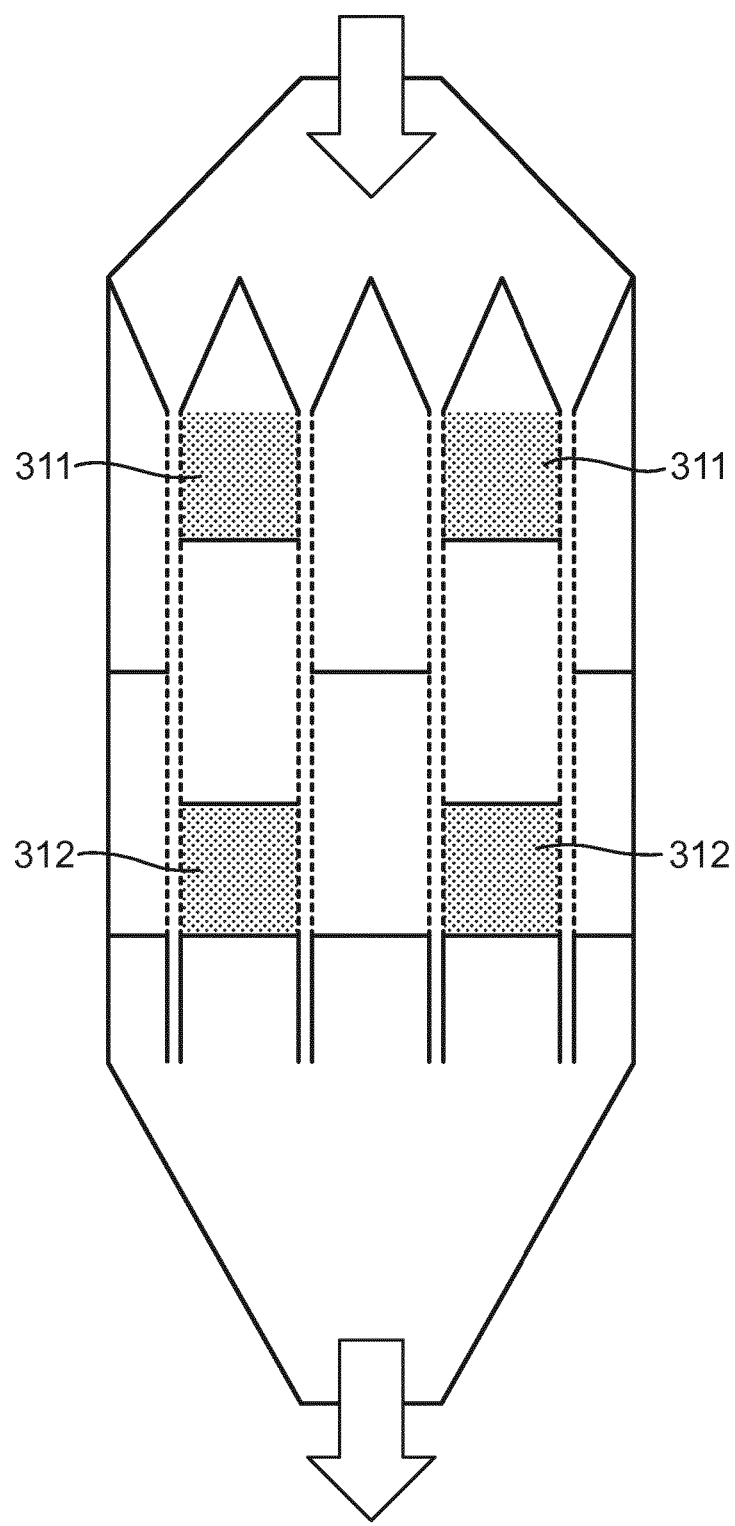
FIG. 3 is a cross-section through a reactor design according to an embodiment.
Figure 4:
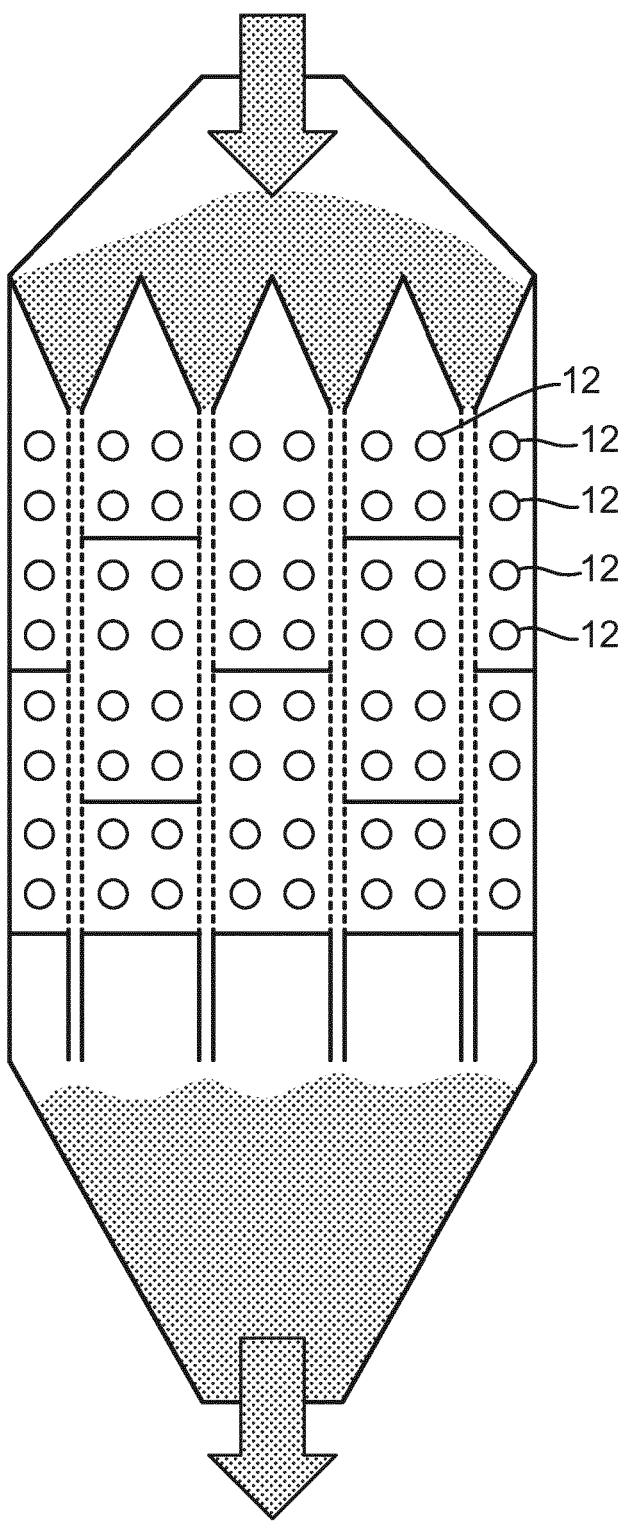
FIG. 4 is a cross-section through a reactor design according to an embodiment.
Figure 5:
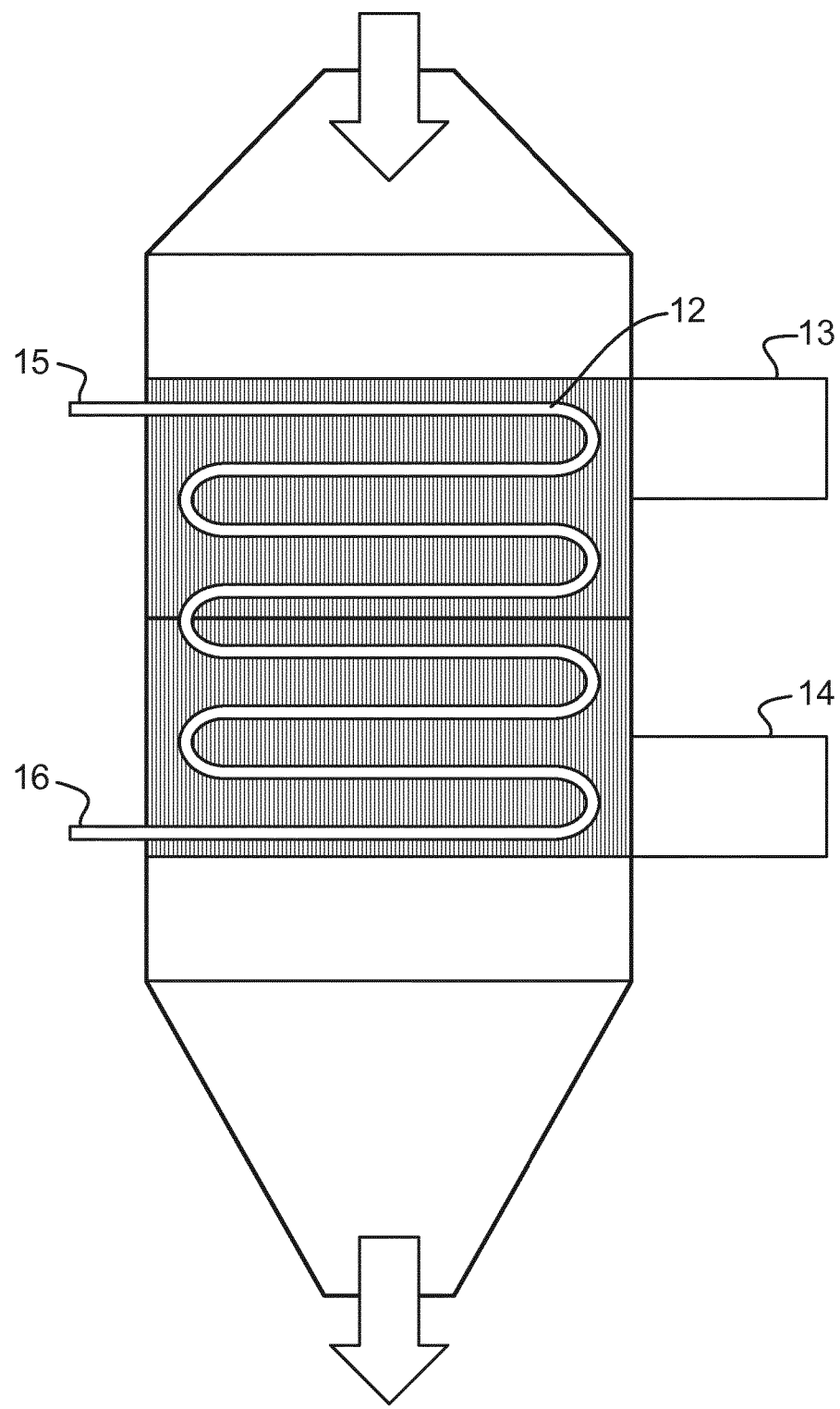
FIG. 5 is a cross-section through a reactor design according to an embodiment.

FIGS. 3 and 5 show gas inlet ports 312 and gas outlet ports 311 for providing a gas flow into the gas ducts 4 of the first reactor. There is a first manifold between the gas inlet ports 312 and the gas inlet 14, and a second manifold between the gas outlet ports 311 and the gas outlet 13. In the shown configuration with the gas inlet 14 below the gas outlet 13, the relative flows of the gas and sorbent through the first reactor comprise a counter flow component in addition to the cross-flow component. However, embodiments also include the gas inlet 14 being above the gas outlet 13 and the relative flows of the gas and sorbent through the first reactor comprising a co-flow component in addition to the cross-flow component.

As shown in FIG. 3, the first and second manifold are preferably arranged to connect to every second gas duct. Embodiments also include manifolds being connected to both sides of the first reactor, such that every gas duct is connected to manifolds for gas supply and extraction. This is particularly appropriate when the gas flows are large as it reduces the gas flow velocity into and out of the first reactor.

Embodiments include there being any number of baffles 2 in each gas duct. For example, the number of baffles 2 in a gas duct may be between one and ten. The superficial cross flow velocity of gas through the first reactor depends on the vertical spacing of the baffles 2 in gas duct and so the number and spacing of the baffles 2 is preferably designed so that an appropriate cross-flow velocity is achieved for the expected operating conditions of the first reactor.

In use, solid particles/pellets of sorbent are fed into the inlet 5 at the top of the first reactor. A carbonaceous gas, such as a flue gas, is fed into the gas inlet 14. The sorbent moves through the upper bed 6 and is split so that it travels into the plurality of parallel moving beds 7. The baffle plates 2 in the gas ducts 4 force the gas to make a plurality of flows through one or more the moving beds 7. In each moving bed 7, the relative flow between the solid and the gas has both a cross-flow component, due to the gas moving across the moving bed 7, and a vertical component, which is either a counter-flow or co-flow relative to that of the sorbent.

An advantage of the first reactor design according to embodiments is that the contact between the gas and sorbent is very effective. The gas is forced to make a plurality of crossings of one or more moving beds 7 as the gas flows from the gas inlet to the gas outlet. This is clearly shown in FIG. 6 in which there is a cross-flow and counter-flow of gas and sorbent. The first reactor has approximate properties to those of a counter flow moving bed reactor in which the solids are distributed over a very large area and there is a low bed thickness. The narrow thickness of the bed allows the gas cross-flow velocity to be low and the gas pressure drop is consequently also low.

Another advantage of the first reactor according to embodiments is that the volume of the gas ducts is a lot larger than that of the moving beds 7. For example, the width of each of the gas ducts may be in the range of 10 cm to 100 cm, whereas the width of each moving bed 7 may be in the range 1 cm to 10 cm. Even when the volume ratio of the gas and solid is greater than a thousand, the first reactor can be easily designed to accommodate gas flow velocities in the preferred range of 10 m/s to 20 m/s, and sorbent velocities in the moving beds 7 that are in the range 1 cm/s to 10 cm/s.

The first reactor according to embodiments has the combined advantages of a fluidized bed reactor's large gas flow capacity and a moving bed reactor's specific retention time of a solid sorbent. The mechanical stress on sorbent particles/pellets is also low due to the low velocity of the sorbent through the moving beds 7.

FIG. 6 shows gas flow paths 18 between adjacent gas ducts 4 via a moving bed 7. The average vertical gas flow velocity, $U_{FG}$, is 19. The superficial cross-flow velocity of the gas, $U_{CF}$, is 20. The moving bed velocity, $U_{MB}$, is 17.

The cooling requirements of the cooling tubes are explained further below.

The specific surface area of randomly packed spheres of diameter 2 mm is 900 $m^2/m^3$. The total bulk volume of the solid sorbent pellets in a first reactor, for a CaO looping CCS system for flue gas from a 400 MW class NGCC, is 72 $m^3$. The results in a total heat surface area between solid sorbent and flue gas of 64800 $m^2$. For a flue gas passing such a bed at a superficial velocity of approximately 1 m/s, the heat exchange coefficient will be in the order of 500 $W/m^2K$. The required heat removal in such a system in order to keep the temperature of the solid sorbent constant is 150 MW. This implies a temperature difference between gas and solid sorbent of:

$$\Delta T = \frac{150 \ MW}{500 \ W m^{-2} K^{-1} \cdot 64{,}800 \ m^2} = 4.6 K$$

For a flow velocity of gas in the ducts of 10-20 m/s, the heat exchange coefficients are 75-150 $W/m^2K$. This is for forced convection over typical tube bundles with tube diameter, D, being 20 mm-50 mm. The specific area of a 20 mm diameter tube in a rectangular array with pitch of 2×D is 40 $m^2$. Embodiments include this being increased by use of finned tubes. The required volume of the gas ducts in the carbonator reactor will be 50 times larger than the volume of the solids beds of 72 m³. This gives following required temperature difference between flue gas and tube wall:

$$\Delta T = \frac{150 \ MW}{100 \ W\,m^{-2}K^{-1} \cdot 40 \ m^2m^{-3} \cdot 50 \cdot 72 \ m^3} = 10.4K$$

This implies that gas will be efficiently cooled each time it passes the heat exchanger installed in the gas ducts. Therefore, the solid sorbent in the moving bed 7 will be cooled indirectly in an efficient manner. As the number of passes increases, the temperature rise in the gas phase per pass of a moving bed 7 will reduce.

Figure 8:
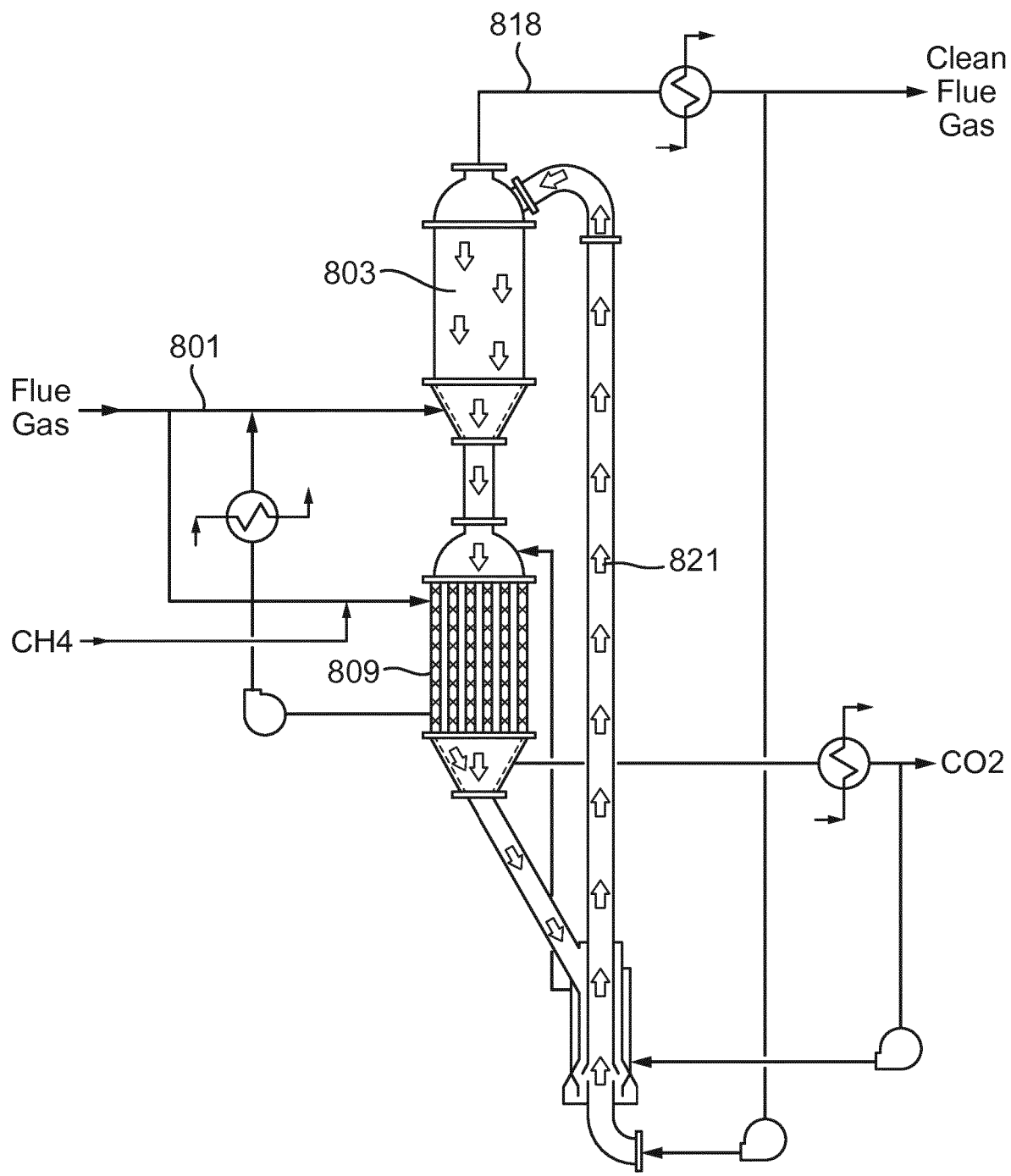
FIG. 8 is a system according to an embodiment.

FIG. 8 shows a CCS system according to an embodiment. A solid sorbent, such as CaO particles/pellets, as described throughout the present document, move around the CCS system in a loop. The CCS system is appropriate for retro-fitting to a fossil fuel power plant.

The CCS system comprises an input of flue gas 801, a carbonator 803, a calcinator 809, a riser 821, and output of cleaned flue gas 818 and a separate output of substantially pure $CO_2$.

The carbonator is preferably a gas-solid reactor of the first embodiment as described with reference to FIGS. 1 to 7F. In the carbonator 803, sorbent reacts with the flue gas to thereby substantially reduce the $CO_2$ concentration in the flue gas. In the calcinator 809, the sorbent is regenerated by heating the sorbent so that it releases $CO_2$. The riser then returns the regenerated sorbent to the input of the carbonator 803.

The first reactor, according to the first embodiment, may also be integrated with one or more other reactors. In particular, FIGS. 9 and 10 also show an implementation of a CCS system according to an embodiment in which an implementation of the first reactor is integrated with a second reactor, as described in detail below.

A second embodiment is described below.

According to the second embodiment, a second reactor 809 is provided. The second reactor 809 is designed to receive solid particles and heat the particles so that the particles release a gas.

A preferred application of the second reactor 809 may be as the above-described calcinator 809 in which the same sorbent that was used in the carbonator 803 is regenerated by heating the sorbent so that it releases carbon dioxide gas.

The second reactor 809 may be used with any type of sorbent. Preferably, the sorbent comprises a metal oxide. More preferably, the sorbent comprises calcium oxide and/or calcium carbonate. Calcium oxide may react in the first reactor 803 with carbon dioxide gas to form calcium carbonate. The sorbent may then be regenerated in the second reactor 809 by heating the calcium carbonate so that it becomes calcium oxide and carbon dioxide gas is released.

The second reactor 809 is described below in the example application of the second reactor 809 receiving particles of calcium carbonate and regenerating the calcium carbonate so that it becomes particles of calcium oxide and carbon dioxide gas is generated.

Figure 9:
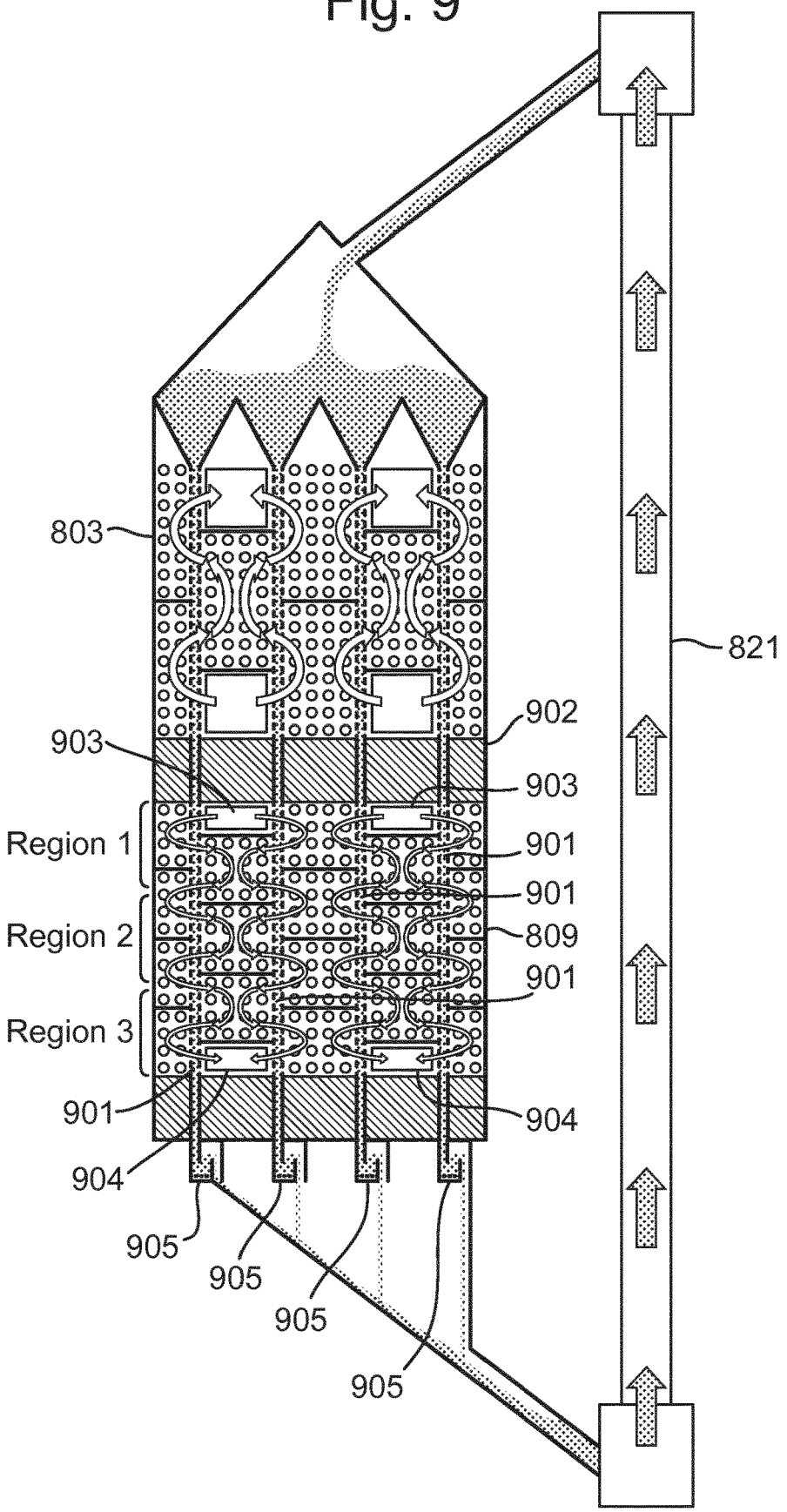
FIG. 9 is a system showing first and second reactor designs according to an embodiment.
Figure 10:
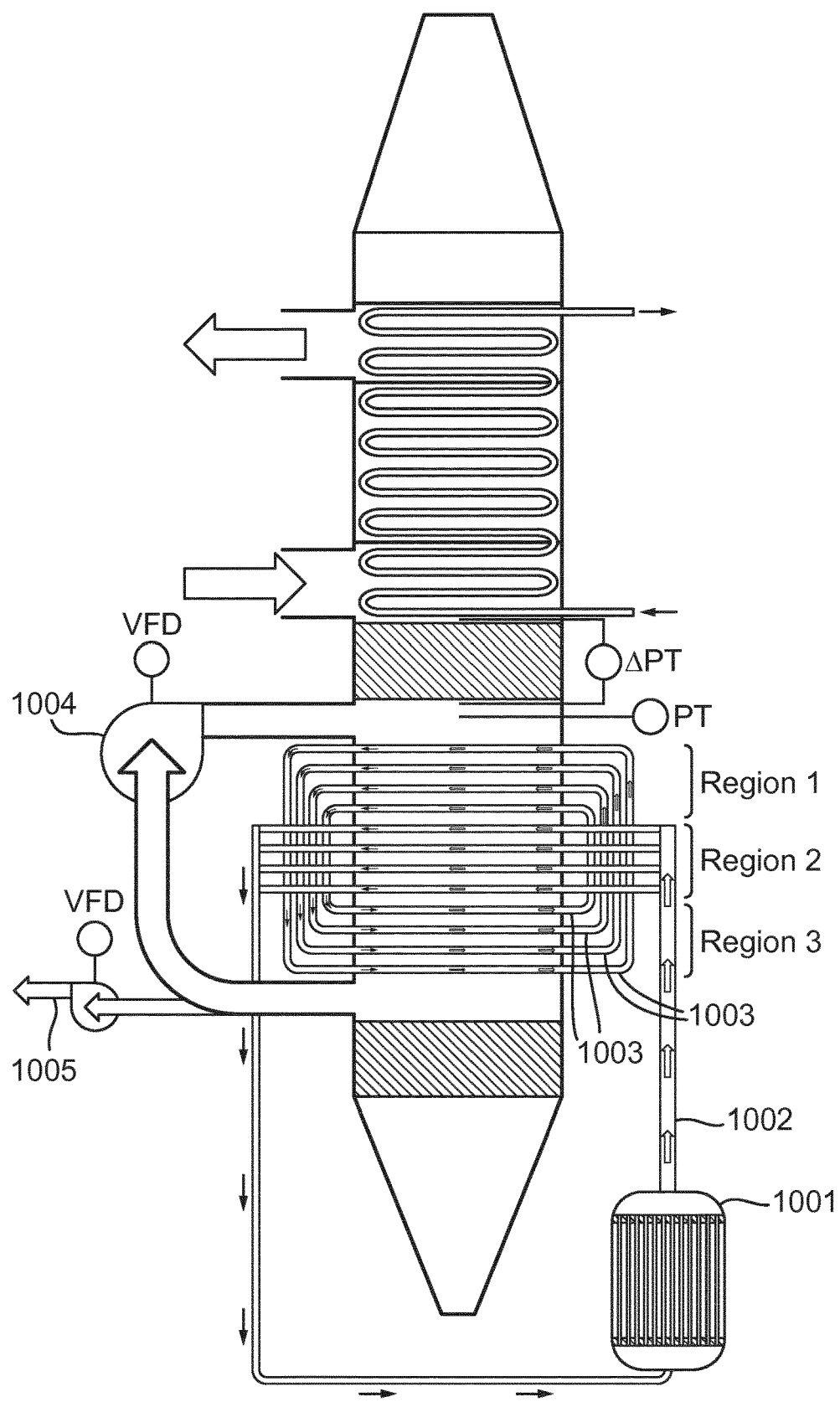
FIG. 10 is a system showing first and second reactor designs according to an embodiment.

Embodiments of the second reactor 809 are shown in FIGS. 9 and 10. The second reactor 809 is shown integrated with an implementation the above-described first reactor 803 and a riser 903.

The second reactor 809 has a similar construction and design features to the first reactor 803 in that the structure of the second reactor 809 supports substantial cross-flows of gas across solid particles that are travelling vertically downwards in a moving bed 901 with the solid particles retained within the moving bed.

The second reactor 809 comprises inlet(s) at the top of the second reactor 809 through which sorbent enters the second reactor 809. At the bottom of the second reactor 809 are outlet(s) through which sorbent exits the second reactor 809. Between the inlet(s) and the outlet(s) is a main body of the second reactor 809. The main body of the second reactor 809 has outer walls. One or more moving beds 901 are provided in the second reactor 809. Each moving bed 901 extends, from an inlet, vertically downwards through the main body of the second reactor 809 to an outlet of the second reactor 809. The main body of the second reactor 809 also comprises at least one gas inlet, through which gas enters the second reactor 809, and at least one gas outlet, through which gas exits the second reactor 809. Between the vertically arranged moving beds 901, as well as the outer walls of the main body, are gas ducts for gas flows in the main body. Each gas duct comprises a plurality of vertically staked chambers.

The walls of the moving beds 901 comprise strainer plates. The strainer plates have the property of retaining the solid sorbent within each moving bed 901 but gas is able to pass through the strainer plates. The strainer plates in the second reactor 809 may be the same as the strainer plates as described earlier for the first reactor 803.

The strainer plates in the second reactor 809 may also be arranged in the same way as the strainer plates as described earlier for the first reactor 803. Accordingly, in order to minimise the friction and stress on the particles of sorbent in the second reactor 809, the strainer plates are preferably orientated vertically. That is to say, the gap between the plates is linear and orientated so that it is parallel to the flow of sorbent through the second reactor 809. Similarly, when the strainer plate is a wedge wire screen, the flat side of the wedge should provide the inner surface of the outer wall of the moving beds 901 in the second reactor 809, as shown in FIG. 7D for the first reactor 803. The wedge should have the property that the openings in the wedge are not so large that particles of the sorbent can pass through the openings, but the openings should be large enough to allow gas to pass through them. The diameter of the sorbent particles/pellets may be about 1 mm to 2 mm and so an appropriate opening distance in the wedge wire screen may be between 0.2 mm to 0.8 mm, preferably 0.5 mm. The width of the flat side of the wedge that provides the inner surface of the outer wall of the moving beds 901 in the second reactor 809, as shown in FIG. 7D for the first reactor 803, may be 1.5 mm Alternatively, the strainer plates may be provided by perforated plates, or a thick rigid perforated plate with fairly large diameter perforation (approx. 10 mm) cladded with a thin sheet with very small perforation (<1 mm). In some applications these may be sufficient for retaining particles of solid sorbent in the moving beds 901 and less expensive than wedge wire screens.

The gas ducts comprise horizontally arranged baffle plates and gas is unable to flow directly through a baffle plate. Preferably, there is at least one baffle plate in each gas duct. The provision of one or more baffle plates in each vertically aligned gas duct divides each gas duct into a plurality of separate and vertically aligned chambers. In any two adjacent gas ducts, all of the baffle plates preferably have different vertical positions.

The arrangement of the baffle plates, strainer plates and moving beds 901 in the second reactor 809 is as described for the first reactor 803. Accordingly, gas is forced to flow through from a gas duct, through a strainer plate and into a moving bed, and through a strainer plate and into a gas duct according to the same process as described earlier with reference to FIG. 6. The gas flow paths from the gas inlet(s) 903 to the gas outlet(s) 904 therefore comprise gas flows through a plurality of chambers, with the gas flowing through one of the moving beds 901 whenever if flows between two chambers.

The main body of the second reactor 809 is substantially a rectangular cuboid. Each of the moving beds 901, gas ducts and chambers in each gas duct are also substantially rectangular cuboids. Two walls of each moving bed 901 are provided by strainer plates, two further walls of each moving bed 901 are provided by parts of the outer wall of the main body and the moving beds 901 are open at each end in order for sorbent to enter and exit the moving bed. Each gas duct is also cuboid and is either formed between two moving beds 901 or between a moving bed 901 and the outer wall of the main body. The baffle plates in the gas ducts are also thin rectangular cuboids. Advantageously, the components of the main body of the second reactor 809 all have a rectangular cuboid construction and can therefore be easily made. The construction of the second reactor 809 is also easier when rectangular cuboid components are used.

Although the main body of the second reactor 809 is preferably rectangular cuboid, embodiments also include the second reactor 809 being cylindrical, as well as other shapes.

When the second reactor 809 is used for the application of regenerating a sorbent, the reaction that regenerates the sorbent should be performed at an appropriate temperature for this reaction. For example, the heating of calcium carbonate to generate calcium oxide and carbon dioxide is preferably performed at about 900° C. When the second reactor 809 is used in a sorbent looping system, such as the system shown in FIGS. 8 to 10, the temperature of the sorbent received by the second reactor 809 is substantially at the temperature that the reaction in the first reactor 803 is performed at. The reaction between calcium oxide and carbon dioxide in the first reactor 803 is preferably performed at about 600° C. The sorbent received by the second reactor 809 is therefore at a lower temperature than an appropriate temperature for the regeneration of the sorbent. The sorbent output from the second reactor 809 is returned to the input of the first reactor 803 via the riser. The temperature of the sorbent received by the first reactor 803 is preferably appropriate for the reaction in the first reactor 803. Accordingly, the temperature of the sorbent output from the second reactor 809 is preferably substantially the temperature required by the first reactor 803.

The second reactor 809 may therefore receive sorbent at about 600° C. and it is preferable for the second reactor 809 to output sorbent at about 600° C. Within the second reactor 809, the sorbent is required to be heated to about 900° C. so that regeneration of the sorbent can occur.

FIG. 9 shows three different regions in the second reactor 809. Region 1 is a first region, Region 2 is a second region and Region 3 a third region.

The first region is provided at the top of the second reactor 809. In the first region, sorbent received by the second reactor 809 is heated substantially to the temperature required for sorbent regeneration.

The second region is provided below the first region. In the second region, the received sorbent is heated at a temperature for regenerating the received sorbent.

The third region is provided at the bottom of the second reactor 809. In the third region, the sorbent is cooled approximately to a temperature that is appropriate for being input to the first reactor 803.

The second region is therefore provided between the first and third regions such that all of the sorbent that flows from the inlet(s) of the second reactor 809 to the outlet(s) of the second reactor 809 is forced to flow through the first region, then through the second region and then then through the third region.

FIG. 10 shows how heat may be supplied to the second region so that the second region is at an appropriate temperature for regenerating the sorbent. The heat may be generated in an external combustor 1001. The external combustor 1001 may be a catalytic combustor and is preferably a catalytic total combustor, such as the catalytic total combustor described in WO/2018/162675, the entire contents of which are incorporated herein by reference.

The heat may be transferred from the external combustor 1001 to the second region by a heat loop/heat exchanger 1002. As shown in FIG. 10, the second reactor 809 comprises pipes in the second region for supplying heat to the second region from the external combustor 1001. As shown in FIG. 10, a working fluid may flow from the external combustor 1001 through a first manifold so that the working is supplied to a plurality of pipes that pass through the second region. A second manifold receives the working fluid that has flowed through the second region and returns the working fluid to the external combustor 1001. The working fluid may be any suitable working fluid. For example, the working fluid may be one of the noble elements (such as Helium), sodium or any other suitable working fluid. If sodium is used the system can be operated as a self-circulating loop-heat-pipe system.

As described above, the first region heats the received sorbent to the temperature required in the second region and the third region cools the sorbent so that the sorbent output from the third region is approximately the same as the temperature received by the first region. The first and third regions may both be connected heat exchangers such that the heat required in the first region is supplied to the first region by the third region. Heat transfer between the first and third regions both efficiently provides heat to the first region and removes heat from the third region.

As shown in FIG. 10, there are preferably a plurality of heat loops/heat exchangers 1003 between the first and third regions. Each of the heat loops 1003 comprises a first part in the first region and a second part in the third region. In each heat loop 1003, heat is transferred from the second part of the heat loop 1003 to the first part of the heat loop 1003.

The symmetry of the second reactor 809 structure results in the sorbent temperature profile from the input of the first region to the output of the first region substantially corresponding to the sorbent temperature profile from the output of the third region to the input of the third region. The efficiency of heat transfer between the first and third regions is highest when the temperature difference between the second part of a heat loop 1003 and the first part of the same heat loop 1003 is small. Accordingly, for each heat loop 1003, the position of the first part of the heat loop 1003 relative to the input and output of the first region substantially corresponds to the position of the second part of the heat loop 1003 relative to the output and input of the second region. That is to say, a heat loop 1003 with a first part that is close to the input of the first region has a second part that is close to the output of the second region. Similarly, a heat loop 1003 with a first part that is close to the output of the first region has a second part that is close to the input of the second region. The first and second parts of each heat loop 1003 are therefore at similar temperatures and this improves the efficiency of heat transfer.

As shown in FIG. 10, the heat loops 1003 that have a first part that is closest to the input of the first region may entirely surround all of the heat loops 1003 with a first part that is further away from the input of the first region. Each heat loop 1003 may be surrounded by another heat loop 1003, with the surrounding 1003 heat loop having first and second parts that are at respective positions in the first and second regions with a lower temperature than those of the surrounded heat loop 1003.

Accordingly, the first, second and third regions of the second reactor 809 all comprise pipes for heat transfer into, or out of, the region. The pipes are preferably not provided in the moving beds 901 of the second reactor 809 and are instead provided only in the chambers of the gas ducts between the moving beds 901.

The heat loops 1003 for transferring heat from the third region to the first region, and the external combustor 1001 to the second region, may be any of a number of known heat loop designs. For example, the heat loops 1003 may be any of the heat loops disclosed in: https://www.qats.com/cms/2014/08/04/understanding-loop-heat-pipes/ (as viewed on 15 Oct. 2018).

The heat transfer from the pipes in the second reactor 809 to the sorbent, and vice versa, is via a forced gas flow through the gas ducts/chambers and through the moving beds 901. A source of the gas that transfers the heat is the gas that is released when the sorbent is regenerated. Gas for the heat transfer may also be supplied into the second reactor 809 via the gas inlet(s) 903 of the second reactor 809. Supplying gas into the second reactor 809 via the gas inlet(s) 903 ensures that there is always an appropriate volume of gas for the required heat transfer between the pipes in each region and the sorbent in the moving beds 901.

The supplied gas to the second reactor 809 through the gas inlet(s) 903 of the second reactor 809 may be the same gas as the gas released by the sorbent. For example, if the gas released when the sorbent is regenerated is carbon dioxide then the supplied gas through the gas inlet(s) 903 of the second region may also be carbon dioxide. By supplying the same gas as that released through the gas inlet(s) 903 the purity of the released gas by the sorbent is not reduced.

FIG. 10 shows how some of the gas flow through the gas outlet(s) 904 of the second reactor 809 can be fed to the gas inlet(s) 903 of the second reactor 809. The proportion of the gas that is fed to the gas inlet(s) 903 may be controlled by a fan 1004 and/or other gas flow control mechanisms. The gas that is not fed to the gas inlets of the second reactor 809 flows out of the system through the gas outlet 1005 and can be stored or used in commercial applications.

Preferably, the gas inlet(s) 903 of the second reactor 809 are at the top of the second reactor 809 and the gas outlet(s) 904 of the second reactor 809 are at the bottom of the second reactor 809. The pressure of the gas at the top of the second reactor 809 can therefore be accurately controlled by controlling the flow of gas into the second reactor 809.

As shown in FIG. 9, a flow control mechanism 905 for controlling the flow of sorbent through each moving bed 901 may be provided at the bottom of the second reactor 809. The flow control mechanism 905 may comprise a loop seal or adjustable baffles as described for the first reactor 803 and shown in FIGS. 7E and 7F. Implementations of a flow control mechanism 905 that may be used are also shown in FIGS. 11A to 11D.

Figure 11A:
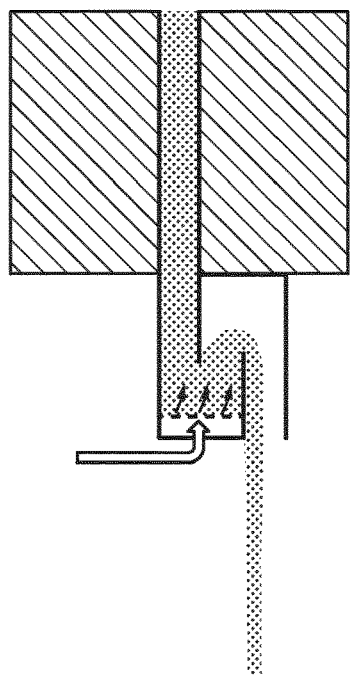
FIGS. 11A, 11B, 11C and 11D show flow control mechanisms that may be used to control the flow through the first and/or second reactor designs according to embodiments.
Figure 11B:
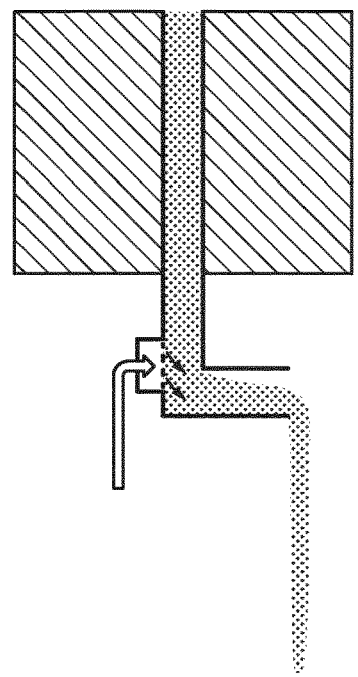
Figure 11C:
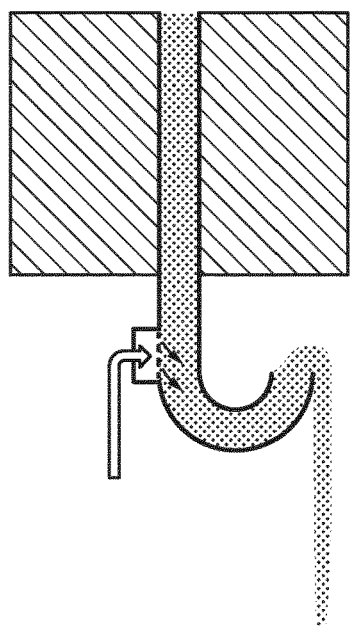

The flow control mechanism 905 shown in FIGS. 11A to 11C are all activated by a gas flow. The flow control mechanism 905 shown in FIG. 11A is a loop seal. The flow control mechanism 905 shown in FIG. 11B is an L-seal. The flow control mechanism 905 shown in FIG. 11C is a J-seal.

Figure 11D:
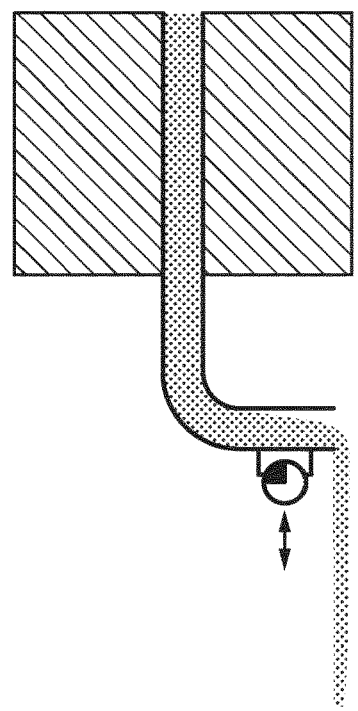

The flow control mechanism 905 shown in FIG. 11D is a vibration activated seal. When the vibrator is not vibrating, the friction between the sorbent particles prevents the sorbent from flowing out of the moving bed. When the vibrator is activated, the vibrator causes the end of the duct comprising the sorbent vibrate. This reduces the friction between the sorbent particles and the sorbent flows out of the duct, and consequently the moving bed.

The second embodiment includes the second reactor 809 being used in any application. Although the second reactor 809 is shown in FIGS. 9 and 10 integrated with the first reactor 803 according to the first embodiment, the second reactor 809 may not be integrated with the first reactor 803 and may be a separate reactor as shown in FIG. 8. The second reactor 809 can be used on its own or in conjunction with any other type of reactor.

According to a third embodiment, the first reactor 803, as described above for the first embodiment, and the second reactor 809, as described above for the second embodiment, are integrated together.

The integration of the first and second reactors is particularly advantageous for the specific application of looping a sorbent of a gas. The sorbent captures gas in the first reactor 803 and then releases the gas in the second reactor 809.

The first reactor 803 may be provided directly above the second reactor 809 as shown in FIGS. 9 and 10. The first reactor 803 is thermally insulated from the second reactor 809 by the insulating section 902. Each of the moving beds 901 pass unobstructed from the first reactor 803, through the insulating section 902 and to the second reactor 809. The walls of the moving beds 901 in the part of the moving bed 901 in the insulating section 902 are a solid wall and not a sintered plate.

Sorbent travels vertically downwards in the moving beds 901 from the inlet(s) of the moving beds 901 in the first reactor 803, through the first reactor 803, through the insulating section 902, through the second reactor 809 and through the outlet(s) of the moving beds 901 in the second reactor 809.

There may be no flow control mechanism at the bottom of the first reactor 803 and only a flow control mechanism 905 at the bottom of the second reactor 809, as described above for the second embodiment.

The third embodiment is particularly preferable in a sorbent looping system in which sorbent that has passed through the first and second reactors is returned to the sorbent inlet(s) of the first reactor 803.

The sorbent that flows out of the flow control mechanism 905 is returned to the top of the first reactor 803 by the riser 821. The riser may be any type of riser. For example the riser may be a gas driven riser as described in WO/2018/162675, the entire contents of which are incorporated herein by reference. The riser may alternatively be a spiral elevator. The spiral elevator may be vibration driven. An demonstration of the operation of a vibration driven elevator is provided here: https://www:youtube.com/watch?v=Foi_J1sJ0wI (as viewed on 15 Oct. 2018). Particles are transported from the bottom of the spiral elevator to the top of the spiral elevator by vibrating the elevator. The riser may alternatively be a mechanical conveyor system.

Sensors may measure the temperatures and pressures throughout the system. There may also be sensors that measure the concentration of the gas to be captured by the sorbent, such as carbon dioxide, in the gas mixture received by the first reactor 803 and the gas flowing out of the first reactor 803. The measurements may be automatically provided to a computing system. The flow of gas into the first reactor 803, the flow of sorbent through the first and second reactors, the flow of gas into the second reactor 809, the cooling of the first reactor 803 and the heating of the second reactor 809 are preferably all automatically controlled by the computer system. The computing system may automatically control the processes in order to efficiently capture a gas, such as carbon dioxide, from the gas mixture received by the first reactor 803. The computing system may also automatically detect operational errors/faults of the system in dependence on the automatic feedback of data from the sensors.

In a preferred implementation of the third embodiment, the gas inlet(s) of the first reactor 803 are at the bottom the first reactor 803 and the gas outlet(s) from the first reactor 803 are at the top of the first reactor 803. The gas inlet(s) 903 of the second reactor 809 are at the top the second reactor 809 and the gas outlet(s) 904 the second reactor 809 are at the bottom of the second reactor 809. This arrangement allows the pressure difference between the bottom of the first reactor 803 and the top of the second reactor 809 to be accurately controlled by controlling the gas flows into the first and second reactors. The pressure difference is preferably controlled such that the gas pressure at the top of the second reactor 809 is slightly larger than the gas pressure at the bottom of the first reactor 803. This prevents any flow of the gas in the first reactor 803 into the second reactor 809 and the consequent reduction of the purity of the captured gas. The pressure difference is preferably controlled such that it is not substantially larger than necessary to prevent gas flow from the first reactor 803 to the second reactor 809 so that a substantial flow of gas from the second reactor 809 to the first reactor 803 does not occur. Appropriate control of the pressure difference also avoids any requirement for a gas solid lock to be provided between the first and second reactors.

The above-described sorbent loping system comprising integrated first and second reactors according to the third embodiment may be used for the application of capturing carbon dioxide from a flue gas. A sorbent captures carbon dioxide in the first reactor 803 and the sorbent is regenerated, with the carbon dioxide being released, in the second reactor 809. The released carbon dioxide can then be used in commercial applications or stored.

The above-described sorbent loping system according to embodiments comprises:

A carbonation region in which a sorbent removes $CO_2$ from a gas mixture comprising $CO_2$;

A heating region in which the sorbent is heated from the carbonation temperature to the sorbent regeneration temperature;

A sorbent regeneration region in which the sorbent is heated at temperature that causes the sorbent to release $CO_2$; and A cooling region in which the sorbent is cooled from the sorbent regeneration temperature to the carbonation temperature.

The system may comprise any of number of possible implementations of each of the above regions.

The processes in the carbonation region may be the earlier described processes in the reactor according to the first embodiment. The heating region, sorbent regeneration region and cooling region may respectively be the first region, second region and third region as described earlier in the second and third embodiments.

Each of the four regions may be provided by a separate apparatus or two or more of the regions may be provided within different parts of the same apparatus.

Two or more of the regions may be coupled with each other, for example by using heat exchangers between heating region and the cooling region as described above. However, embodiments also include each of the regions being operated independently from the other regions. That is to say, the heating region may comprise a separate heat source from the heat source that provides heat to the sorbent regeneration region and the cooling region may comprise a heat sink that is not coupled to the heat source of the heating region.

The system may also comprise any of number of possible implementations of techniques for moving the sorbent between the different regions.

Figure 12:
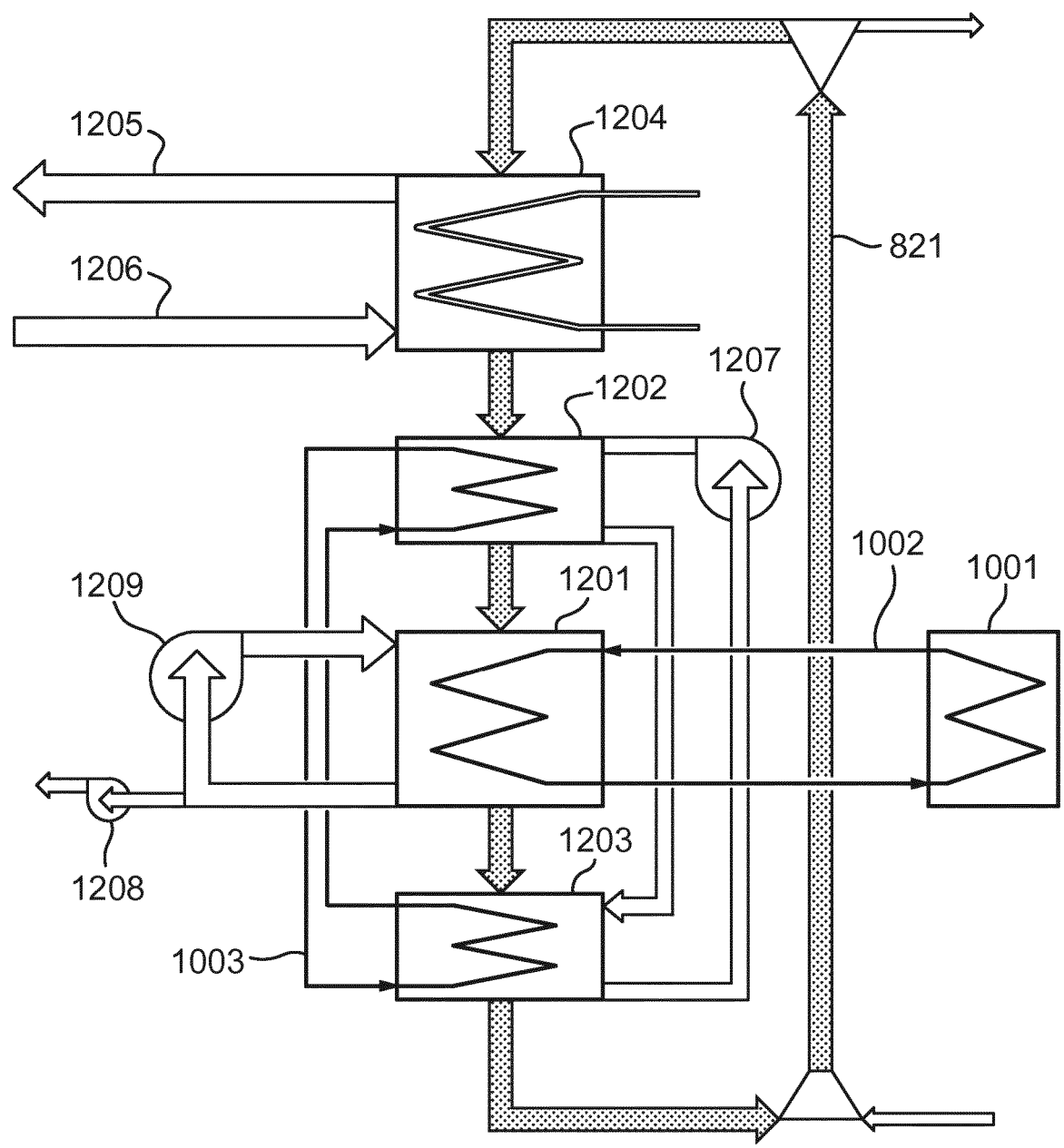
FIG. 12 is a system according to an embodiment.

An implementation of a sorbent loping system according a fourth embodiment is shown in FIG. 12. The system comprises a carbonation region 1204, a heating region 1202, a sorbent regeneration region 1201 and a cooling region 1203. There is a gas input 1206 for a carbonaceous gas, such as a flue gas, and a first gas output 1205 of the cleaned gas. There is a second gas output 1208 for the released gas in the sorbent regeneration region 1201. There is a riser 821 for returning the sorbent to the sorbent input of the carbonation region 1204. The riser may be the riser 821 as described earlier in at least the first and third embodiments.

Each of the carbonation region 1204, heating region 1202, sorbent regeneration region 1201 and cooling region 1203 may be provided by separate reactors or as different parts of one or more reactors. Each of the carbonation region 1204, heating region 1202, sorbent regeneration region 1201 and cooling region 1203 may be operated independently from each of the other regions, or two or more of the regions may be coupled together.

The carbonation region 1204 may be provided by the first reactor 803 as described in the first and third embodiments. The heating region 1202, sorbent regeneration region 1201 and cooling region 1203 may be respectively provided by the first region, second region and third region as described in the second and third embodiments. There may be heat loops/heat exchangers 1003 between the heating region 1202 and cooling region 1203 as described of the first and third regions in the second and third embodiments.

The heat source of the sorbent regeneration region 1201 may be an external combustor 1001 that transfers heat to the sorbent regeneration region 1201 as described earlier for the second and third embodiments.

In each of the carbonation region 1204, heating region 1202, sorbent regeneration region 1201 and cooling region 1203, there is contact between particles of solid sorbent and a gas.

The one or more reactors for providing each of these regions may have the reactor design as described in the first to third embodiments in which the reactors support substantial cross-flows of gas across solid particles that are travelling vertically downwards in a moving bed.

In the implementation of a sorbent loping system 1207 according to the fourth embodiment shown in FIG. 12, the heating region 1202 and cooling region 1203 are coupled together by the heat loops 1003 as described earlier for the second and third embodiments.

A first gas circulation system 1207 circulates a gas between the heating region 1202 and cooling region 1203. The gas is used in each region to transfer heat between the heat loops 1003 and the sorbent. The first gas circulation system 1207 may comprise one or more fans, with variable frequency drives, valves and other components for controlling the amount of gas in the first gas circulation system 1207 and the rate at which gas flows around the first gas circulation system 1207.

A second gas circulation system 1209 circulates a gas within the sorbent regeneration region 1201. The gas is used in the sorbent regeneration region 1209 to transfer heat between the heat loops 1002 and the sorbent. The second gas circulation system may comprise one or more fans, with variable frequency drives, valves and other components for controlling the amount of gas in the second gas circulation system 1209 and rate at which gas flows around the second gas circulation system 1209. The second gas circulation system 1209 comprises the second gas output 1208 for outputting substantially pure $CO_2$.

In the fourth embodiment, the first gas circulation system 1207 is separate from the second gas circulation system 1209. The gas used in the first gas circulation system 1207 may therefore be different from the gas used in the second gas circulation system 1209.

The gas used in the first gas circulation system 1207 may be, for example, air, nitrogen, clean flue gas or an inert gas. It is preferable for the gas in the first gas circulation system 1207 to be a gas that does not substantially react with the sorbent so that the reactions with the sorbent substantially only occur in the carbonation region 1204 and sorbent regeneration region 1201.

The gas used in the second gas circulation system 1209 is preferably the same gas released by the sorbent, i.e. $CO_2$, so that substantially pure $CO_2$ is output and an additional process to obtain substantially pure $CO_2$ is not required.

Figure 13:
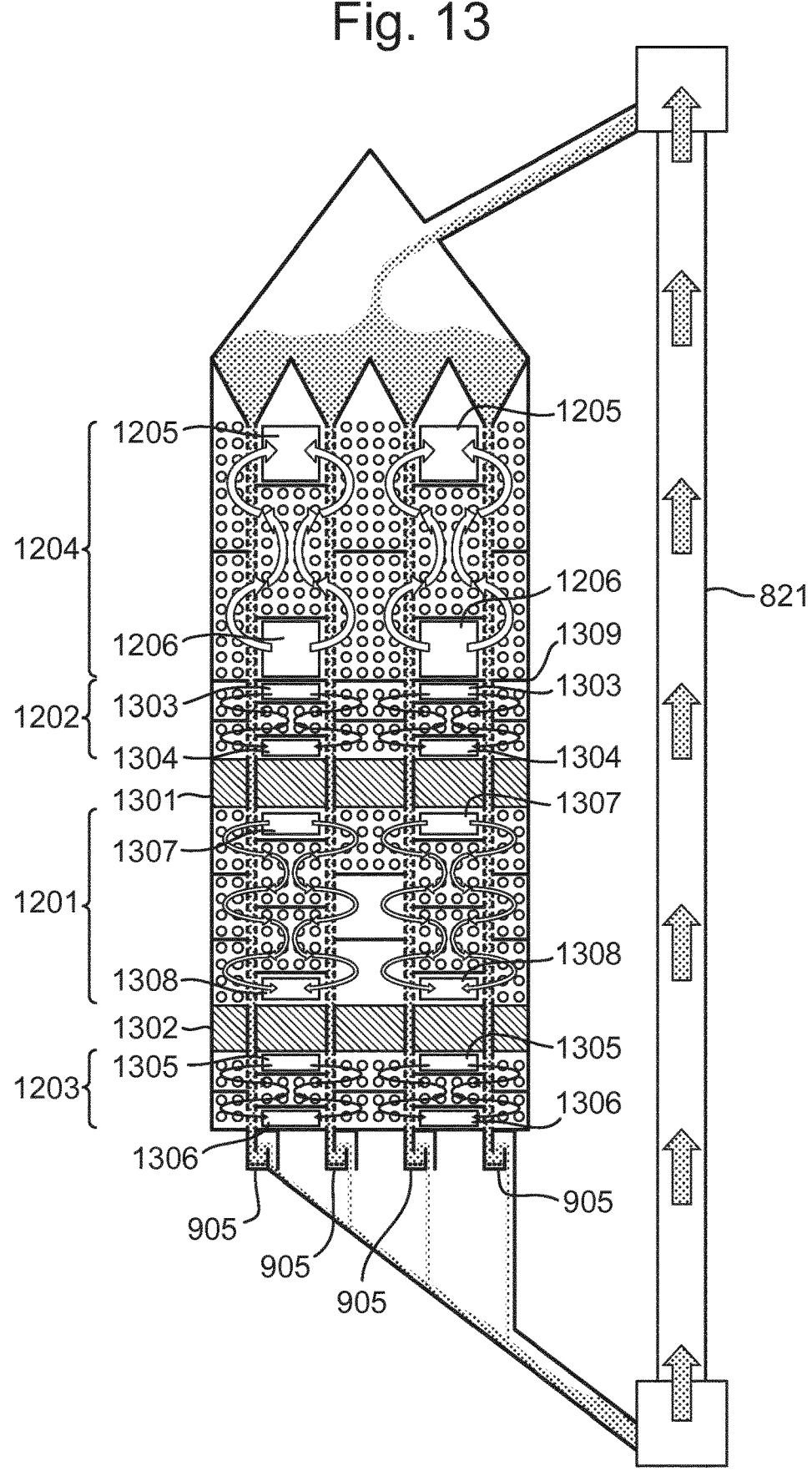
FIG. 13 is a system according to an embodiment.
Figure 14:
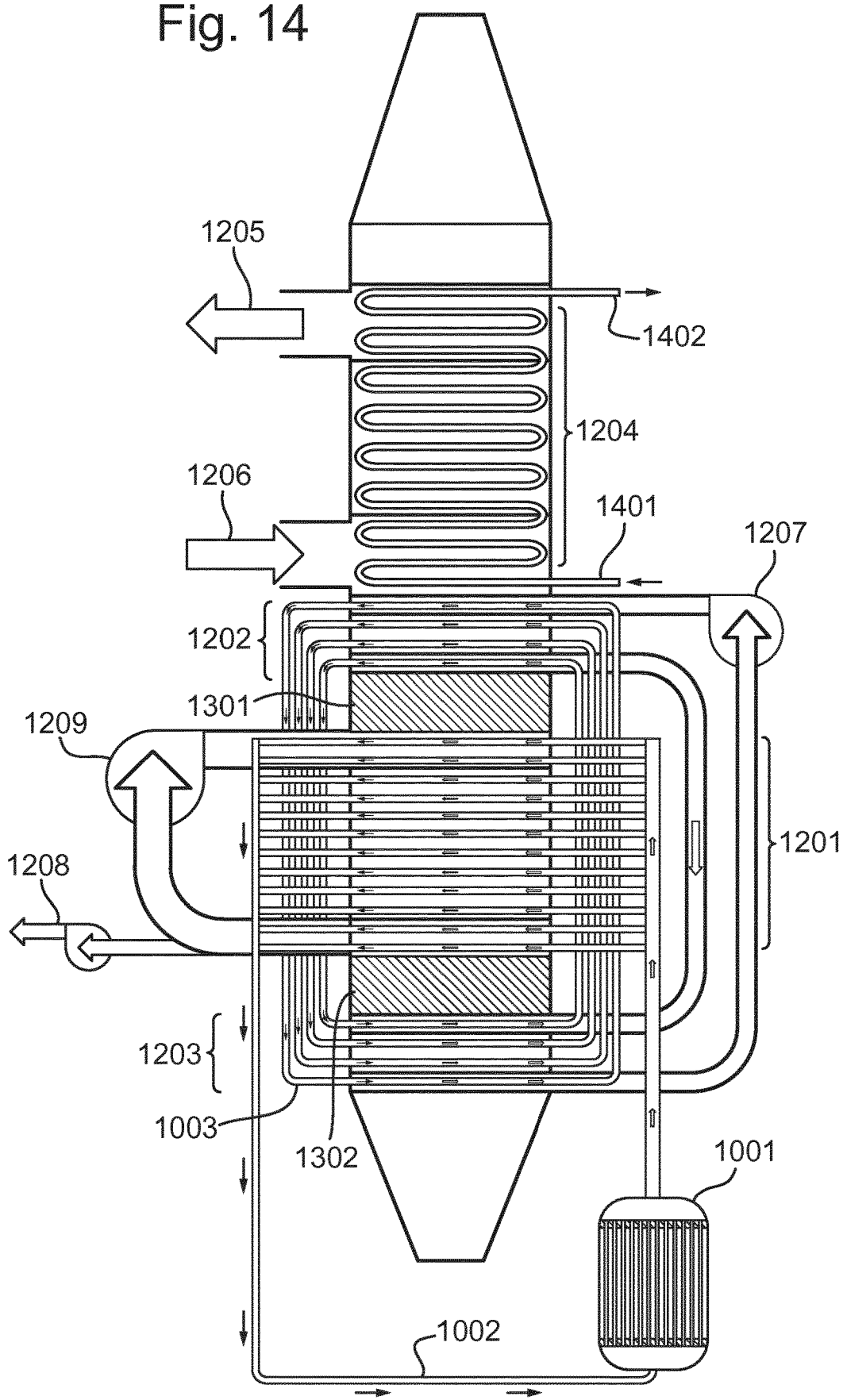
FIG. 14 is a system according to an embodiment.

FIGS. 13 and 14 show orthogonal cross-sections of an implementation of a system according to the fourth embodiment. The carbonation and sorbent regeneration processes are integrated within a single reactor of the system.

The reactor of the system comprises a carbonation region 1204, a heating region 1202, a sorbent regeneration region 1201 and a cooling region 1203.

The reactor has a similar design to the reactors as described in the previous embodiments. The reactor comprises inlet(s) at the top of the reactor through which sorbent enters the carbonation region 1204 of the reactor. At the bottom of the cooling region 1203 of the reactor are outlet(s) through which sorbent exits the cooling region 1203. Between the inlet(s) and the outlet(s) is a main body of the reactor. The main body of the reactor has outer walls. One or more moving beds are provided in the reactor. Each moving bed extends, from an inlet, vertically downwards through the main body of the reactor to an outlet of the reactor. Between the vertically arranged moving beds, as well as the outer walls of the main body, are gas ducts for gas flows in the main body. Each gas duct comprises a plurality of vertically stacked chambers. The walls of the moving beds comprise strainer plates and the gas ducts comprise baffle plates, for providing a substantial cross-flow of sorbent and gas, as described for the first to third embodiments. The main body of the reactor is preferably rectangular cuboid, but embodiments also include the reactor being cylindrical, as well as other shapes.

At the bottom of the reactor is a flow control mechanism 905 for controlling the flow of sorbent through the reactor. The flow control mechanism 905 may be the same as described earlier for the first and second embodiments with reference to FIGS. 7E, 7F, 11A, 11B, 11C and 11D.

The carbonation region 1204 comprises at least one gas inlet 1206, through which gas enters the carbonation region 1204, and at least one gas outlet 1205, through which gas exits the carbonation region 1204. The at least one gas inlet 1206 may be provided at the bottom of carbonation region 1204 and the at least one gas outlet 1205 may be provided at the bottom of carbonation region 1204. The carbonation region 1204 may separated from the heating region 1202 by a gas barrier 1309 that comprises plates across the gas ducts with all of the plates being in the same plane. The carbonation region 1204 comprises a coolant input 1401 and a coolant output 1402. In use, a coolant flows through the carbonation region 1204 to maintain the carbonation region 1204 at an appropriate temperature for the carbonation reaction.

The heating region 1202 is separated from the sorbent regeneration region 1201 by a first barrier 1301 that allows the sorbent to flow between the heating region 1202 and the sorbent regeneration region 1201 but substantially prevents gas flow between these regions. The heating region 1202 comprises one or more gas inputs 1303 and one or more gas outputs 1304. The one or more gas inputs 1303 may be provided at the top of the heating region 1202 and the one or more gas outputs 1304 may be provided at the bottom of the heating region 1202.

The sorbent regeneration region 1201 is separated from the cooling region 1203 by a second barrier 1302 that allows the sorbent to flow between the sorbent regeneration region 1201 and the cooling region 1203 but substantially prevents gas flow between these regions. The sorbent regeneration region 1201 comprises at least one gas input 1307 and at least one gas output 1308. The at least one gas input 1307 may be provided at the top of the sorbent regeneration region 1201 and the and at least one gas output 1308 at the bottom of the sorbent regeneration region 1201. The heat source of the sorbent regeneration region 1201 may be an external combustor 1001 that transfers heat to the sorbent regeneration region 1201 as described earlier for the second embodiment. The sorbent regeneration region 1201 comprises a second gas circulation system 1209 as described above. The gas used in the second gas circulation system 1209 is preferably the same gas released by the sorbent, i.e. $CO_2$.

The cooling region 1203 comprises one or more gas inputs 1305 and one or more gas outputs 1306. The one or more gas inputs 1305 may be provided at the top of the cooling region 1203 and the one or more gas outputs 1305 may be provided at the bottom of the cooling region 1203.

The heating region 1202 and cooling region 1203 are coupled together by heat loops 1003, as described above and earlier for the second and third embodiments, as well as a first gas circulation system 1207 as described above. The gas used in the first gas circulation system 1207 may be, for example, air, nitrogen, clean flue gas or an inert gas.

The temperature profile through the reactor is substantially as described for the third embodiment. The temperature of the sorbent in the carbonation region 1204 may be about 600° C. The temperature of the sorbent at the output of the heating region 1202 may be about 850° C. In the a sorbent regeneration region 1201, the received sorbent may be heated to about 900° C. The temperature of the sorbent at the output of the cooling region 1203 may be about 600° C. to 650° C.

In the fourth embodiment, sensors may measure the temperatures and pressures throughout the reactor/system. There may also be sensors that measure the concentration of the gas to be captured by the sorbent, such as carbon dioxide, in the gas mixture received by the carbonation region 1204 and the gas flowing out of the carbonation region 1204. The measurements may be automatically provided to a computing system. The flow of gas into the carbonation region 1204, the flow of sorbent through the reactor, the flow of gas into and around the first and second gas circulation systems, the cooling in the carbonation region 1204, the heating of the sorbent regeneration region 1201 and the heat exchange between the heating region 1202 and cooling region 1203 are preferably all automatically controlled by the computer system. The computing system may automatically control the processes in order to efficiently capture a gas, such as carbon dioxide from a gas mixture.

The computing system may also automatically detect operational errors/faults of the system in dependence on the automatic feedback of data from the sensors.

Preferably, the pressures throughout the system are controlled so that there is substantially no pressure difference across the gas barrier 1309, the first barrier 1301 and the second barrier 1302 in the reactor so there is substantially no gas flow across the interfaces between the different regions within the reactor.

The fourth embodiment also includes alternative implementations in which two or more of the carbonation region 1204, heating region 1202, sorbent regeneration region 1201 and cooling region 1203 are provided by separate reactors and not integrated together in a single reactor.

The above-described implementation of sorbent loping system of the fourth embodiment may be used for the application of capturing carbon dioxide from a flue gas. A sorbent captures carbon dioxide in the carbonation region 1204 and the sorbent is regenerated, with the carbon dioxide being released, in the sorbent regeneration region 1201. The released carbon dioxide can then be used in commercial applications or stored.

According to a fifth embodiment, the system is designed for the application of hydrogen, $H_2$, production. $H_2$ production by reforming processes generates a gas mixture comprising $H_2$ and $CO_2$. The system of the fifth embodiment uses similar processes to those described for the fourth embodiment to remove the $CO_2$ from the gas mixture to thereby generate substantially pure $H_2$. The sorbent used in the fifth embodiment may be the same sorbent of $CO_2$ as described in the first to fourth embodiments.

A known process is sorption enhanced reforming, SER. In an SER reaction, methane is reacted with $H_2O$ to generate CO, $CO_2$ and $H_2$. An SER reaction may be performed at approximately 575° C.

Another known process is a sorption enhanced water gas shift, SEWGS, reaction. In an SEWGS reaction, CO is reacted with $H_2O$ to generate $CO_2$ and $H_2$. An SEWGS reaction may be performed at approximately 400° C. to 450° C.

In the fifth embodiment, one or more reactors are provided for performing SER and SEWGS reactions. Generated $CO_2$ by the SER and SEWGS reactions is removed by a moving bed of a sorbent of $CO_2$. The sorbent is then regenerated and returned to a sorbent input of the moving bed.

Figure 15:
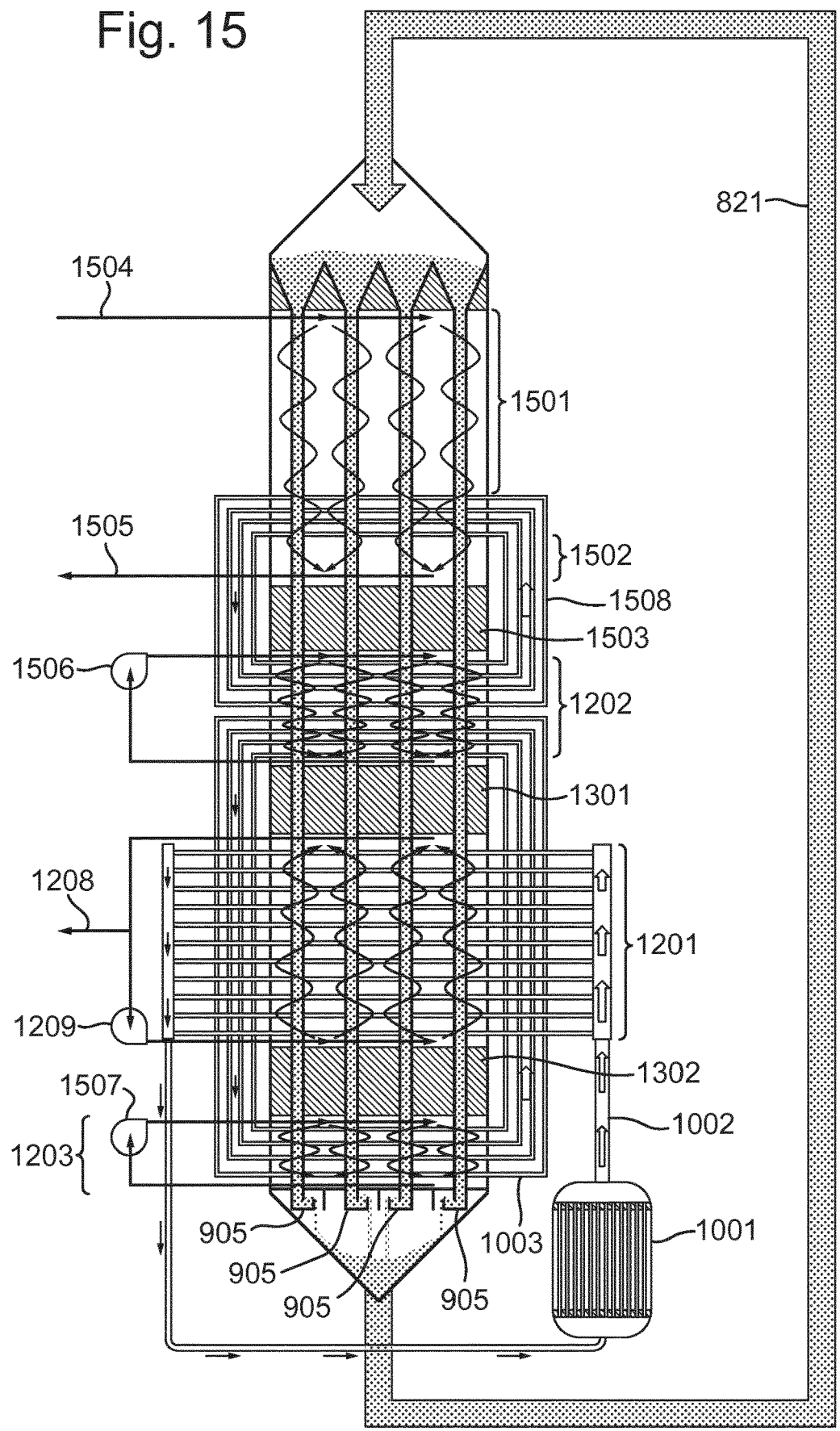
FIG. 15 is a system according to an embodiment.
Figure 16:
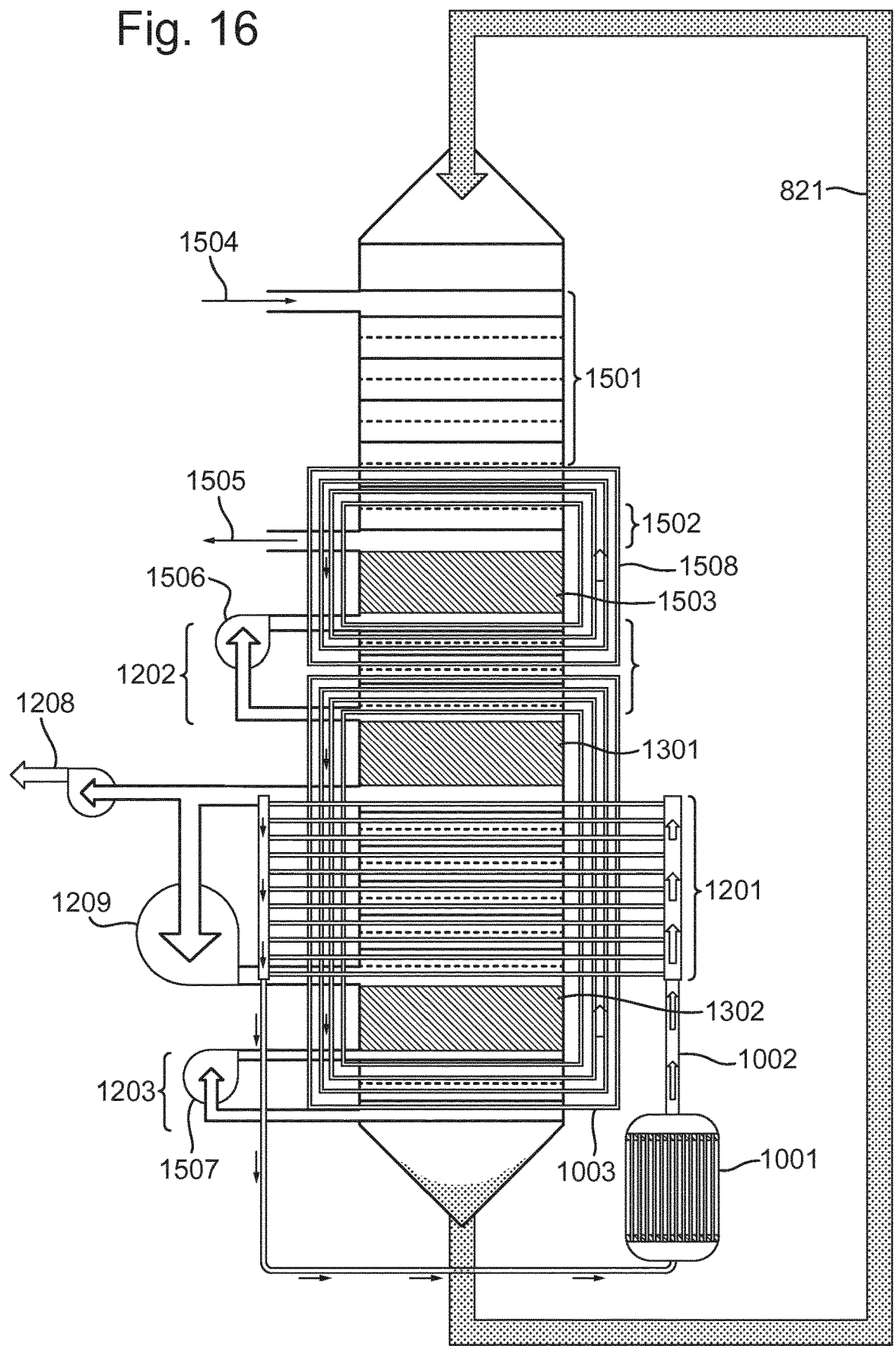
FIG. 16 is a system according to an embodiment.
Figure 17:
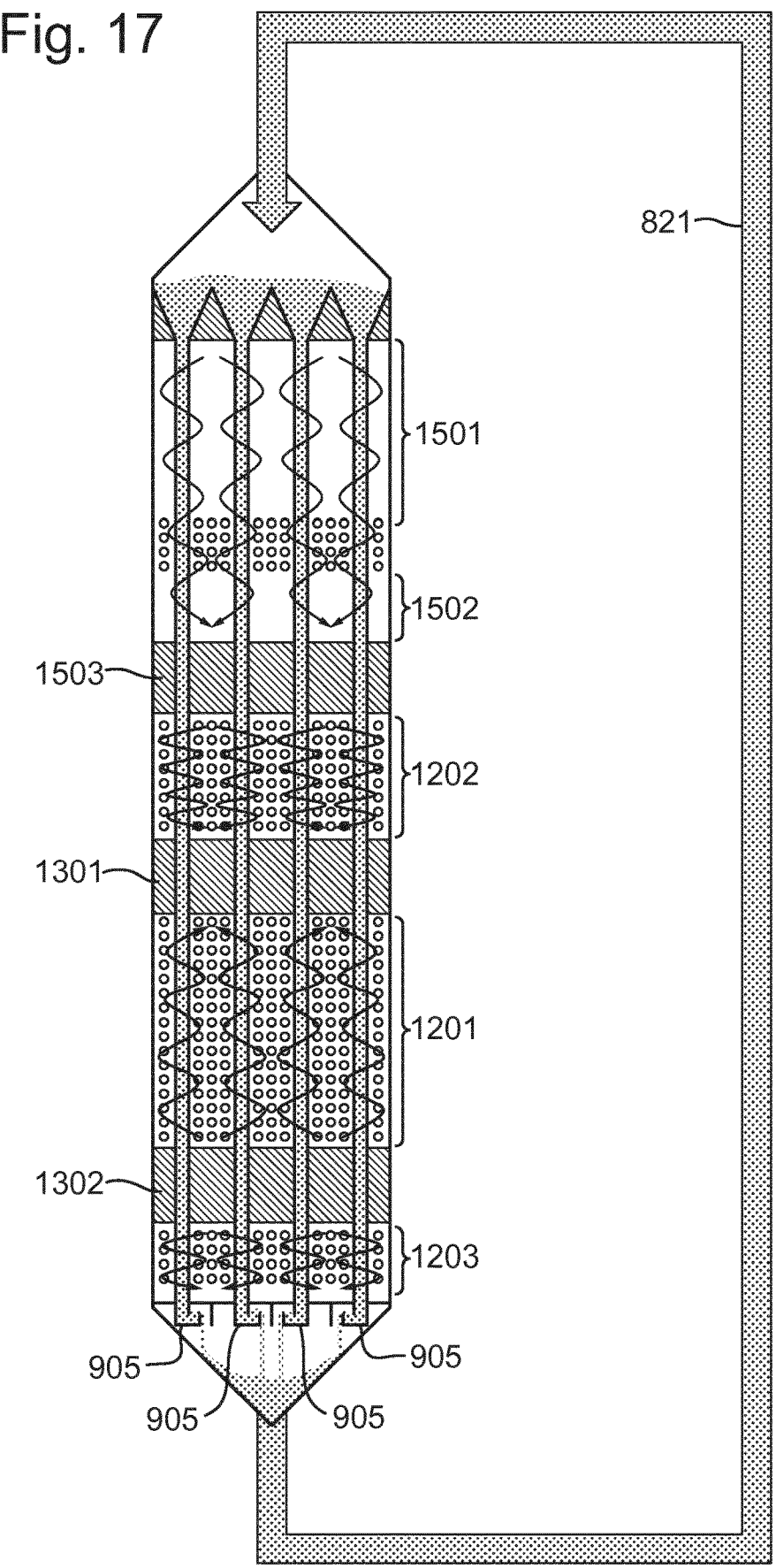
FIG. 17 is a system according to an embodiment.

Implementations of the fifth embodiment are shown in FIGS. 15, 16 and 17. FIGS. 15, 16 and 17 show cross-sections of implementations of a system according to the fifth embodiment. The SER, SEWGS, carbonation and sorbent regeneration processes are all integrated within a single reactor of the system.

FIG. 15 shows a first implementation of a system according to the fifth embodiment in which pipes for heating and cooling pass through moving beds of the reactor system.

FIGS. 16 and 17 show a second implementation of a system according to the fifth embodiment. In the second implementation, the pipes are orthogonal to how they are shown in FIG. 15. The pipes of the second implantation only pass through gas ducts and not the moving beds. All of the other features of the first and second implementations of the fifth embodiment may be the same as each other.

The system comprises a riser 821 for moving sorbent from the sorbent input of the reactor to the sorbent out of the reactor. The riser may be substantially as described for the previous embodiments. However, for gas driven implementations of the riser, the gas should be one of the gasses input to the SER and SEWGS regions of the reactor, such as methane.

The reactor of the system comprises an SER region 1501, an SEWGS region 1502, a heating region 1202, a sorbent regeneration region 1201 and a cooling region 1203. The SER region 1501 and SEWGS region 1502 together provide a carbonation region in which sorbent removes the $CO_2$ that is generated by the reaction processes.

The reactor has a similar construction to the reactor as described for the fourth embodiment. The reactor comprises inlet(s) at the top of the reactor through which sorbent enters the SER region 1501 of the reactor. At the bottom of the cooling region 1203 of the reactor are outlet(s) through which sorbent exits the cooling region 1203. Between the inlet(s) and the outlet(s) is a main body of the reactor. The main body of the reactor has outer walls. One or more moving beds are provided in the reactor. Each moving bed extends, from an inlet, vertically downwards through the main body of the reactor to an outlet of the reactor. Between the vertically arranged moving beds, as well as the outer walls of the main body, are gas ducts for gas flows in the main body. Each gas duct comprises a plurality of vertically stacked chambers. The walls of the moving beds comprise strainer plates and the gas ducts comprise baffle plates, for providing a substantial cross-flow of sorbent and gas, as described for the first to fourth embodiments. The main body, and/or moving beds, of the reactor are preferably rectangular cuboid, but embodiments also include the reactor being cylindrical, as well as other shapes.

At the bottom of the reactor is a flow control mechanism 905 for controlling the flow of sorbent through the reactor. The flow control mechanism 905 may be the same as described earlier for at least the first and second embodiments with reference to FIGS. 7E, 7F, 11A, 11B, 11C and 11D.

The SER region 1501 comprises at least one gas inlet 1504, through which gas enters the SER region 1501. In use, $CH_4$ and $H_2O$ are input into the SER region 1501 and the above described SER reaction is performed at about 575° C.

Another reaction that occurs in the SER region 1501 is a carbonation reaction with sorbent in the moving bed. The carbonation reaction removes from the gas mixture in the SER region some, or all, of the $CO_2$ generated by the SER reaction. There may be no need for a cooling, or heating, system in the SER region because the SER reaction is endothermic and the carbonation reaction is exothermic. The reaction temperature may therefore remain approximately constant at about 575° C. to 600° C. so long as both the SER reaction and the carbonation reaction are occurring. The reaction temperature may fall when the $CO_2$ concentration falls and less carbonation is occurring.

In an alternative implementation of the present embodiment, the SER region may comprise a heating system and/or cooling system for controlling the reaction temperature.

The SEWGS region 1502 is located below the SER region 1501 and there may be no barrier separating the SER region 1501 and SEWGS region 1502. A SEWGS reaction is performed in the SEWGS region. The temperature at which the SEWGS reaction is performed may be about 450° C. The sorbent and/or gas temperature may fall from 575° C. to 450° C. as the amount of carbonation decreases. However, as described in more detail below, the sorbent and/or gas temperature may be actively decreased by a cooling system. The $CO_2$ generated by the SEWGS reaction is removed by the sorbent and so substantially the only gas remaining is the $H_2$ product of the SER and SEWGS reactions. The SEWGS region 1502 comprises at least one gas outlet 1505, through which gas exits the SEWGS region 1502.

The SEWGS region 1502 may be separated from the heating region 1202 by a third gas barrier 1503 that allows the sorbent to flow between the SEWGS region 1502 and the heating region 1201 but substantially prevents gas flow between these regions.

Heat loops/heat exchangers 1508 may be provided between the SEWGS region 1502 and the heating region 1202. The heat loops/heat exchangers 1508 cool the gas and/or sorbent so that it is at an appropriate temperature for the SEWGS reaction. The heat loops/heat exchangers 1508 may have the same arrangement of loops as the previously described heat loops in the second to fourth embodiments. That is to say, a first loop may be surrounded by a second loop with the second loop having parts in higher temperature zones than the first loop.

In an alternative implementation of the present embodiment, there is no heat exchanger between the SEWGS region 1502 and the heating region 1202. An independent heating and/or cooling system may be provided between the SER region 1501 and the SEWGS region 1502 for controlling the temperature of the gas and/or sorbent as it enters the SEWGS region. Similarly, an independent heating and/or cooling system may be provided in the heating region 1202 for controlling the temperature of the gas and/or sorbent therein.

The heating region 1202 is separated from the sorbent regeneration region 1201 by a first barrier 1301, as described for the fourth embodiment. A difference between the implementation of the heating region 1202 as shown in FIGS. 15 to 17 and that shown in FIGS. 12 to 14 is that the heating region 1202 in FIGS. 15 to 17 has its own gas circulation system that is not coupled to the gas circulation system of the cooling region 1203. The heating region 1202 may otherwise be substantially the same as the heating region 1202 as described for the fourth embodiment.

The sorbent regeneration region 1201 is separated from the cooling region 1203 by a second barrier 1302 as described for the fourth embodiment. The sorbent regeneration region 1201 may be substantially the same as that of the fourth embodiment. The heat source of the sorbent regeneration region 1201 may be an external combustor 1001 that transfers heat to the sorbent regeneration region 1201 via heat loop/heat exchanger 1002 as described for the second and fourth embodiments. The sorbent regeneration region 1201 comprises its own gas circulation system 1209 as described for the fourth embodiment. The gas used in the second gas circulation system 1209 is preferably the same gas released by the sorbent, i.e. $CO_2$.

A difference between the implementation of the cooling region 1203 as shown in FIGS. 15 to 17 and that shown in FIGS. 12 to 14 is that the cooling region 1203 in FIGS. 15 to 17 has its own gas circulation system that is not coupled to the gas circulation system of the heating region 1202. The cooling region 1203 may otherwise be substantially as described for the fourth embodiment.

The gas used in each of the heating region 1202 and cooling region 1203 may be, for example, air, nitrogen, $H_2$ or an inert gas.

In the fifth embodiment, sensors may measure the temperatures and pressures throughout the reactor/system. There may also be sensors that measure the concentration of the gasses, such as hydrogen and carbon dioxide. The measurements may be automatically provided to a computing system. All of the gas flows, the flow of sorbent through the reactor, the heating and any cooling are preferably automatically controlled by the computer system. The computing system may also automatically detect operational errors/faults of the system in dependence on the automatic feedback of data from the sensors.

Preferably, the pressures throughout the system are controlled so that there is substantially no pressure difference across the third gas barrier 1503, the first barrier 1301 and the second barrier 1302 in the reactor. Such pressure control helps to ensure that there is substantially no gas flow across the interfaces between the different regions within the reactor.

The fifth embodiment also includes alternative implementations in which two or more of the SER region 1501, SEWGS region 1502, heating region 1202, sorbent regeneration region 1201 and cooling region 1203 are provided by separate reactors and not integrated together in a single reactor.

The above-described implementation of sorbent loping system of the fifth embodiment may be used for the application of hydrogen generation by reforming processes. Advantageously, the $CO_2$ bi-product of the $H_2$ production process is captured.

In an alternative implementation of the fifth embodiment, there is an SER region but no SEWGS region. This allows a simpler reactor design because there is no need for a cooling system to cool the gas and/or sorbent between the SER region and the heating region 1202. A single gas circulation system may circulate gas between the heating region 1202 and cooling region 1203 as described above for the fourth embodiment. The present implementation of the fifth embodiment may otherwise be substantially as described above with reference to FIGS. 15 to 17.

In the present implementation, an SEWGS reaction is not performed and so the produced gas may comprise CO, and/or other gasses, in addition to the main $H_2$ product. The main $H_2$ product may be polished, i.e. purified, by passing it through a membrane or using other techniques. Alternatively, for applications in which the purity of the $H_2$ is not critical, the main $H_2$ product may be used directly. For example, the main $H_2$ product may be combusted in a gas turbine.

Other techniques may be used to heat the sorbent up the temperature required in the sorbent regeneration region 1201. For example, exhaust gas may be injected from a catalytic combustor that will both heat the sorbent directly, and also indirectly due the carbonation occurring. A heat exchanger with any suitably high temperature source may also be used.

The sorbent regeneration region may alternatively be heated directly by injecting oxygen and $CH_4$, and/or CO, from gas reforming.

The sorbent output from the sorbent regeneration region may alternatively be cooled directly the riser 821, that is a gas riser, by using cold $CH_4$ to lift the gas and then using the $CH_4$ as a reactant in the SER region.

The fifth embodiment has been described with reference to the use of methane as a reactant in a reforming process. Embodiments also include natural gas, and other hydrocarbon containing gasses, being used instead of methane.

Implementation of the fifth embodiment also includes the use of a catalyst for accelerating the SER reaction and/or SEWGS reaction. The catalyst may be any known catalyst for SER and/or SEWGS processes. The catalyst may be, for example, a reforming catalyst of Pd—Ni/Co supported on a hydrotalcite-derived material, i.e. a Pd—Ni/Co HT catalyst.

The pellets/particles of catalyst may be added to those of the sorbent so that the looped particles around the entire system comprise both sorbent particles and separate catalyst particles.

Alternatively, pellets/particles may be used that are a combined sorbent and catalyst. For example, the catalyst may be deposited on some, or all, of the outer surfaces of the sorbent pellets/particles during the production process of the sorbent. Advantages of such a combined sorbent and catalyst over separate particles of sorbent and catalyst may include the diffusional limitations being decreased, easier circulation around the entire system and lower total cost.

Alternatively, the supply of the catalyst to the SER and SEWGS regions may be independent from that of the sorbent. For example, the SER and SEWGS regions may comprise fixed beds of catalyst. The fixed beds may be arranged in parallel to the moving beds of sorbent with gas being able to pass through both beds. An advantage of this implementation is that if the sorbent is discarded, and replaced with a new sorbent, the catalyst, that may comprise expensive metals, is not also discarded.

Embodiments also include the use of known SER and/or SEWGS processes to generate an $H_2$ and $CO_2$ gas mixture. The $H_2$ and $CO_2$ gas mixture is then used as the gas input to the system according the third or fourth embodiments that is used to separate the $CO_2$ and $H_2$ gasses.

The sorbent that may be used in embodiments is described in more detail below.

A particularly advantageous sorbent for carbon dioxide is a mixed oxide, in particular CaO, MgO and NaO based mixed oxide forms. Particularly preferred sorbents are the sorbents as disclosed in International patent applications with application numbers PCT/EP2006/003507 and PCT/EP2018/055828, the entire contents of which are incorporated herein by reference.

The sorbent may be comprised of solid particles. The particles may be small and substantially spherical balls and/or pellets (e.g. substantially cylindrical). The active component of the sorbent, for example calcium oxide/calcium carbonate, is preferably combined with a binding agent.

The capture and release of the gas by the sorbent is due to reaction of the sorbent with the gas. The reactions may be adsorption and/or desorption processes or by other processes that result in the capturing and/or release of a gas.

Embodiments also include the capture of other gasses than carbon dioxide, in particular embodiments include the capture of hydrogen sulphide from sour gas. The sorbent may be one or more of MnO, CuO and ZnO.

Embodiments also include the use of a mixture of different sorbents so that more than one gas is captured by the gas capture system. For example, different sorbent particles for carbon dioxide and hydrogen sulphide could be mixed and then used together. The gas capture system may then capture both carbon dioxide and hydrogen sulphide from a gas stream.

The sorbent changes between a used form and a regenerated form as it is recirculated about the system. The term sorbent refers generally to particles of the sorbent at any point in the sorbent cycle and may refer to the sorbent when it is in either its used form or regenerated form. In addition, the sorbent at any point in the sorbent cycle may always be a mixture of particles of the sorbent in the used form and in the regenerated form. The gas capturing and sorbent regenerating processes change the relative concentrations of the forms of the sorbent at a particular point in the sorbent cycle.

Embodiments include a number of modifications and variations to the above-described techniques.

Embodiments are not restricted to the use of a solid sorbent and the solid used in the first and second reactors according to embodiments may be any type of solid reactant.

Embodiments are not restricted to the use of reactor designs as specifically shown in the figures and the reactor designs according to embodiments may be any type of mass transfer system.

The openings in the sidewalls of each moving bed are all preferably less than 500 μm, more preferably less than 400 μm and further preferably less than 200 μm.

The first and second reactors according to embodiments can be made with a wide range of dimensions depending on the application.

The walls of lower bed 9 of the first reactor may be sloped at an angle between about 60 and 70 degrees in order to facilitate the movement of sorbent out of the first reactor due to gravity.

Embodiments include the lower bed 9 of the first reactor comprising one or more space consuming structures that may be hollow. These assist the movement of the sorbent out of the first reactor.

The baffle plates are preferably substantially rigid so that they help to strengthen the structure of the first and second reactors, in particular the walls of the moving beds 7, 901.

In the second to fifth embodiments, the combustor 1001 that provides heat for the sorbent regeneration process is not restricted to being external from the second reactor 809 and embodiments include the combustor 1001 being integrated in the second reactor 809. The heat source for the sorbent regeneration is preferably a catalytic combustor, and more preferably a catalytic total combustor. The heat source may be provided by any known technique in sorbent regeneration processes. In particular, the heat source may comprise the combustion of a carbonaceous fuel in the presence of air and/or pure oxygen. The heat source for the sorbent regeneration may be, for example, a gas stream, such as a flue gas stream, from another process, and/or excess heat from a furnace, such as in the metal production industry.

In the second to fourth embodiments, heat is transferred between the first and third regions of the second reactor 809 by heat loops 1003. Embodiments include the first and third regions of the second reactor 809 alternatively having independent respective heating and cooling systems and the first and third regions not being connected to each other by heat loops.

In the second to fifth embodiments, the supplied gas to the second reactor 809 through the gas inlet(s) 903 of the second reactor 809 is not restricted to being the same gas as the gas that is released during the regeneration of the sorbent and embodiments include the supplied gas to the second reactor 809 being a different gas as the gas released by the sorbent.

In at least the fourth embodiment, some of the gas in the carbonation region 1204 may be used as the circulated gas by the first gas circulation system. There may be no gas barrier 1309 and no gas input(s) 1303. Gas from the gas output(s) 1304 is supplied to the cooling region 1203. Gas output(s) 1306 from the cooling region may supply gas to a gas stream comprising the main flow of gas out of the system through the gas outlet 1205.

It will be understood that the implementation of embodiments may comprise a number of standard components that are not explicitly described herein. For example, the system may comprise one more fans and valves for controlling the flows of gas and sorbent around the system.

The first and second reactors both comprise gas ducts with chambers in the gas ducts separated by baffles. The number of baffles, and consequent number of chambers, in the gas ducts of each reactor may be different. The spacing between the baffles in each reactor may or may not be constant. In particular, the baffles may have a variable vertical spacing between each other. The length of the gas chambers may therefore increase, or decrease, along the vertical length of the reactor.

Throughout embodiments the use of moving beds is described. The moving beds according to embodiments are generally mass transfer regions.

Embodiments have been described with reference to a solid sorbent based on CaO. However, embodiments include the first and second reactors being used with other types of solid sorbent for use in CCS.

Embodiments include the first and second reactors being used in other applications than CCS. In particular, the sorbent may, for example, be a sorbent of $SO_2$ or other gasses.

Although embodiments have been presented with the gas to be cleaned being flue gas, embodiments may be used with any gas and are not restricted to being a flue gas from a combustion process. The gas to be cleaned may be referred to as a dirty gas. The dirty gas may be sour gas directly output from a well head. The sour gas would be cleaned by capturing the hydrogen sulphide content.

Embodiments also include cleaning gasses (by removing $CO_2$ and/or other gasses) in industries such as the power generation industry, the metal production industry, cement production industry and mineral processing industry. In particular, embodiments can be used to clean gasses from cement production processes, blast furnace processes, steel production processes and reforming processes for hydrogen production.

Embodiments are appropriate for industrial scale processes. In particular, embodiments are particularly appropriate for providing a gas capture system that captures carbon dioxide gas generated by a power station/plant. This includes all types of power plant that generate carbon dioxide gas, such as power plants that generate power by combusting a carbonaceous fuel. The gas capture system according to embodiments is arranged to receive flue gas output from the power plant and remove carbon dioxide from the flue gas. The power plant may be a natural gas combined cycle plant. A heat exchanger may be used to pre-heat air used in the power plant using heat generated in gas capture system.

All of the components of the gas capture system of embodiments are scalable such that the gas capture system is suitable for both capturing gas from the power stations that are the largest generators of carbon dioxide gas as well a power stations that are relatively small generators of carbon dioxide gas.

Embodiments include the following numbered clauses:

1. A mass transfer system for providing mass transfer between a gas and a solid reactant, the mass transfer system comprising:
    a gas inlet arranged to receive a gas flow into the mass transfer system;
    a gas outlet arranged to provide a gas flow out of the mass transfer system;
    a reactant inlet arranged to receive an input of solid reactant into the mass transfer system;
    a reactant outlet arranged to provide an output of solid reactant from the mass transfer system;
    one or more mass transfer regions arranged between the reactant inlet and the reactant outlet such that, in use, the solid reactant is retained within the one or more mass transfer regions as the solid reactant moves through the mass transfer regions and the mass transfer between the gas and the solid reactant occurs in the one or more mass transfer regions;
    a first gas chamber; and
    a second gas chamber, that is different from the first gas chamber;
    wherein the first gas chamber, second gas chamber and one or more mass transfer regions are arranged such that, in use, there is a flow path for gas from the gas inlet to the gas outlet that comprises gas flowing from the first gas chamber into one of the one or more mass transfer regions, the gas then flowing from said one of the mass transfer regions into the second gas chamber and the gas then flowing from the second gas chamber back into said one of the mass transfer regions.
2. The mass transfer system according to clause 1, wherein the first gas chamber, second gas chamber and said one of the one or more mass transfer regions are arranged such that, in use, the gas flow from the first gas chamber into said one of the one or more mass transfer regions is a direct gas flow; and the gas flow from said one of the one or more mass transfer regions into the second gas chamber is a direct gas flow.
3. The mass transfer system according to clause 1 or 2, wherein there are a plurality of mass transfer regions.
4. The mass transfer system according to clause 3, wherein the number of mass transfer regions is between 3 and 20; the number of mass transfer regions is preferably 10.
5. The mass transfer system according to any preceding clause, further comprising:
    an upper bed for the solid reactant;
    a main body that comprises the one or more mass transfer regions; and
    an lower bed for the solid reactant;
    wherein:
    the upper bed is arranged between the reactant inlet and the main body; and
    the lower bed is arranged between the main body and the reactant outlet.
6. The mass transfer system according to clause 5, wherein:
    the main body is substantially cuboid; and
    each of the one or more mass transfer regions is substantially cuboid.
7. The mass transfer system according to any preceding clause, wherein each of the one or more mass transfer regions is arranged such that, in use, solid reactant moves vertically downwards through the mass transfer region.
8. The mass transfer system according to any preceding clause, wherein each mass transfer region comprises sidewalls that each separate the mass transfer region from a gas chamber.

9. The mass transfer system according to clause 8, wherein each of the sidewalls is configured such that, in use, gas is able to flow through the sidewall and substantially no solid reactant can pass through the sidewall.
10. The mass transfer system according to clause 8 or 9, wherein:
    each sidewall is a plate that comprises openings; and
    the diameter of the openings in the plate is 400 μm or less.
11. The mass transfer system according to any preceding clause, wherein:
    one or more gas ducts are provided between each two adjacent mass transfer regions and/or between a mass transfer region and an outer wall of the main transfer system;
    each gas duct comprises a plurality of gas chambers, wherein the gas chambers in each gas duct are separated by one or more baffle plates that gas is unable to flow through.
12. The mass transfer system according to clause 11, wherein the gas chambers in each gas duct are aligned vertically with adjacent gas chambers separated by a horizontal baffle plate.
13. The mass transfer system according to clause 11 or 12, wherein each baffle plate is arranged either between the side walls of two mass transfer regions or between the sidewall of a mass transfer region and an outer wall of the mass transfer system.
14. The mass transfer system according to any of clauses 11 to 13, wherein there is at least one baffle pate in each gas duct.
15. The mass transfer system according to any of clauses 11 to 14, wherein the number of baffle plates in each gas duct is between 2 and 5.
16. The mass transfer system according to any of clauses 11 to 15, wherein the baffle plates are arranged such that, in use, gas is arranged to flow across one or more mass regions at least three times when the gas flows from the gas inlet to the gas outlet.
17. The mass transfer system according to any preceding clause, wherein the mass transfer system comprises cooling tubes in one or more of the gas chambers; and
    in use, the cooling tubes are arranged to cool gas in the gas chambers.
18. The mass transfer system according to any preceding clause, further comprising a flow control mechanism at an end of each mass transfer region for controlling the rate at which solid reactant can move through the mass transfer region.
19. The mass transfer system according to clause 18, wherein the flow control mechanism is a loop seal.
20. The mass transfer system according to clause 18 or 19, wherein each flow control mechanism comprises an gas inlet; and
    in use, some of the gas is fed into the gas inlet of each flow control mechanism in order to control the rate at which the solid reactant moves through the one or more mass transfer regions.
21. The mass transfer system according to any preceding clause, wherein:
    the reactant inlet is arranged above the reactant outlet; and
    the gas inlet is arranged below the a gas outlet such that, in use, there is a counter flow of gas and solid reactant through the one or more mass transfer regions.
22. The mass transfer system according to any of clauses 1 to 20, wherein:
    the reactant inlet is arranged above the reactant outlet; and
    the gas inlet is arranged above the a gas outlet such that, in use, there is a co-flow of gas and solid reactant through the one or more mass transfer regions.
23. The mass transfer system according to any preceding clause, wherein the solid reactant is a sorbent.
24. The mass transfer system according to clause 23, wherein the sorbent is a sorbent of carbon dioxide gas.
25. A carbon capture and storage, CCS, system comprising the mass transfer system according to any preceding clause.
26. A method of mass transfer between a gas and a solid reactant in a mass transfer system:
    providing a flow path of a solid reactant through one or more mass transfer regions of the mass transfer system, wherein the solid reactant is retained within the one or more mass transfer regions as the solid reactant moves through the one or more mass transfer regions and the mass transfer between a gas and the solid reactant occurs in the one or more mass transfer regions; and
    providing a flow path of the gas through the mass transfer system such that the gas flows from a first gas chamber of the mass transfer system into one of the one or more mass transfer regions, the gas then flows from said one of the mass transfer regions into a second gas chamber of the mass transfer system, that is different from the first gas chamber, and the gas then flows from the second gas chamber back into said one of the mass transfer regions.
27. The method according to clause 26, wherein the mass transfer system is a mass transfer system according to any of clauses 1 to 24.

Embodiments also include the following numbered statements:
1. A mass transfer system arranged to provide mass transfer between a solid and a gas, the mass transfer system comprising:
    one or more reactant inlets arranged to receive an input of particles of solid reactant into the mass transfer system;
    one or more reactant outlets arranged to provide an output of particles of solid reactant from the mass transfer system;
    one or more gas outlets arranged to provide a flow of gas out of the mass transfer system;
    a heat source for supplying heat to the mass transfer system;
    one or more heat loops with each heat loop comprising a first part and a second part;
    wherein the mass transfer system is configured so that it comprises first, second and third regions, with the first region provided between the one or more reactant inlets and the second region, the second region provided between the first region and the third region, and the third region provided between the second region and the one or more reactant outlets such that, when the mass transfer system is in use with reactant moving through the mass transfer system, the reactant moves through the first region before moving through the second region, and the reactant moves through the second region before moving through the third region;

wherein the heat source is provided in the second region and is arranged to heat reactant in the second region so that, in use, the reactant releases a gas;

wherein, for each of the one or more heat loops, the first part of the heat loop is provided in the first region and is arranged to heat the reactant in the first region; and wherein, for each of the one or more heat loops, the second part of the heat loop is provided in the third region and is arranged to cool the reactant in the third region.

2. The mass transfer system according to statement 1, wherein the heat source in the second region is part of one or more further heat loops that transfer heat into the mass transfer system from a heat source that is external from the mass transfer system.

3. The mass transfer system according to statement 1 or 2, wherein there are a plurality of reactant inlets and a plurality of reactant outlets.

4. The mass transfer system according to statement 3, the mass transfer system comprising:

a plurality of mass transfer regions, wherein each mass transfer region is arranged between a reactant inlet and a reactant outlet such that, in use, the solid reactant is retained within the mass transfer regions as the solid reactant moves through the mass transfer regions and the mass transfer between the solid reactant and the gas occurs in the mass transfer regions;

a plurality of gas ducts, wherein each gas duct is provided either between two adjacent mass transfer regions or between a mass transfer region and an outer wall of the mass transfer system, wherein each gas duct comprises a plurality of gas chambers, wherein the gas chambers in each gas duct are separated by one or more baffle plates that gas is unable to flow through, and wherein the gas chambers in each gas duct are aligned vertically with adjacent gas chambers separated by a baffle plate;

wherein the plurality of gas chambers in the plurality of gas ducts comprise a first gas chamber and a second gas chamber, wherein the first gas chamber is comprised by a different gas duct than the gas duct that comprises the second gas chamber;

wherein one of the plurality of mass transfer regions is arranged between the gas duct that comprises the first gas chamber and the gas duct that comprises the second gas chamber;

wherein the first gas chamber, second gas chamber, baffle plates and said one of the plurality of mass transfer regions are arranged such that, in use, there is a flow path for gas that comprises gas flowing from the first gas chamber into said one of the mass transfer regions, the gas then flowing from said one of the mass transfer regions into the second gas chamber and the gas then flowing from the second gas chamber back into said one of the mass transfer regions.

5. The mass transfer system according to statement 4, wherein the number of mass transfer regions is between 2 and 20; and the number of mass transfer regions is preferably 10.

6. The mass transfer system according to statement 4 or 5, further comprising:

a main body that comprises the mass transfer regions; wherein:

the main body is substantially cuboid; and each of the mass transfer regions is substantially cuboid.

7. The mass transfer system according to statement 4 or any statement dependent thereon, wherein each of the mass transfer regions is arranged such that, in use, solid reactant moves vertically downwards through the mass transfer region.

8. The mass transfer system according to statement 4 or any statement dependent thereon, wherein each mass transfer region comprises sidewalls that each separate the mass transfer region from a gas chamber.

9. The mass transfer system according to statement 7, wherein the sidewalls comprise plates with openings such that, in use, gas is able to flow through the sidewalls and substantially no solid reactant can pass through the sidewalls.

10. The mass transfer system according to statement 9, wherein the diameter of the openings in each plate is 600 μm or less.

11. The mass transfer system according to statement 4 or any statement dependent thereon, wherein each baffle plate is arranged either between the side walls of two mass transfer regions or between the sidewall of a mass transfer region and an outer wall of the mass transfer system.

12. The mass transfer system according to statement 4 or any statement dependent thereon, wherein there is at least one baffle pate in each gas duct.

13. The mass transfer system according to statement 4 or any statement dependent thereon, wherein the number of baffle plates in each gas duct is between 2 and 10.

14. The mass transfer system according to statement 4 or any statement dependent thereon, further comprising a flow control mechanism at an end of each mass transfer region for controlling the rate at which solid reactant can move through the mass transfer region.

15. The mass transfer system according to statement 14, wherein the flow control mechanism is a loop seal.

16. The mass transfer system according to statement 14 or 15, wherein each flow control mechanism comprises an gas inlet; and in use, gas is fed into the gas inlet of each flow control mechanism in order to control the rate at which the solid reactant moves through the mass transfer regions.

17. The mass transfer system according to statement 14 or 15, wherein each flow control mechanism comprises a vibrator;

wherein, in use, the rate at solid reactant moves through each flow control mechanism is controlled by the vibrator.

18. The mass transfer system according to statement 4 or any statement dependent thereon, wherein the heat source, the first part of each heat loop and the second part of each heat loop are arranged in the gas chambers.

19. The mass transfer system according to statement 18, wherein the heat source, the first part of each heat loop and the second part of each heat loop are not provided in the mass transfer regions.

20. The mass transfer system according to statement 4 or any statement dependent thereon, further comprising one or more gas inlets, wherein the gas inlets are provided above the one or more gas outlets.

21. The mass transfer system according to any preceding statement, wherein the solid reactant comprises a metal carbonate, such as calcium carbonate; and in use, the mass transfer system generates carbon dioxide gas by heating the metal carbonate.

22. A carbon capture and storage system comprising the mass transfer system according to any preceding statement.

23. The system according to statement 22 when statement 22 is dependent on statement 2, the system further comprising a heat source that is external from the mass transfer system;
wherein the heat source that is external from the mass transfer system is preferably a catalytic combustor, and more preferably a catalytic total combustor.

24. The system according to statement 22 or 23, when dependent on statement 20, further comprising a gas looping system that is arranged supply some of the gas that flows out of the one or more gas outlets to the one or more gas inlets.

25. The system according to any of statements 22 to 24, further comprising a second mass transfer system;
wherein, in use, a sorbent captures a gas in the second mass transfer system, the sorbent is regenerated in the mass transfer system according to any of statements 1 to 21, and the sorbent is then returned to the second mass transfer system such that the sorbent is circulated around the system.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A gas capture system comprising:
a gas inlet arranged to receive a gas flow into the system;
a gas outlet arranged to provide a gas flow out of the system;
a gas capture region for mass transfer between a gas and a sorbent of the gas; and
a sorbent regeneration region for regenerating the sorbent by heating the sorbent so that the sorbent releases a gas;
wherein:
the gas capture region is arranged to receive sorbent from the sorbent regeneration region;
the sorbent regeneration region is arranged to receive sorbent for regeneration from the gas capture region;
the sorbent is a solid sorbent of carbon dioxide gas; and
the gas capture region comprises:
a sorbent inlet arranged to receive an input of sorbent into the gas capture region;
a sorbent outlet arranged to provide an output of sorbent from the gas capture region;
one or more mass transfer regions arranged between the sorbent inlet and the sorbent outlet such that, in use, the sorbent is retained within the one or more mass transfer regions as the sorbent moves through the mass transfer regions and the mass transfer between the gas and the sorbent occurs in the one or more mass transfer regions;
a first gas chamber; and
a second gas chamber, that is different from the first gas chamber;
wherein the first gas chamber, second gas chamber and one or more mass transfer regions are arranged such that, in use, there is a flow path for gas that comprises gas flowing from the first gas chamber into one of the one or more mass transfer regions, the gas then flowing from said one of the mass transfer regions into the second gas chamber and the gas then flowing from the second gas chamber back into said one of the mass transfer regions;
wherein the sorbent regeneration region comprises:
a sorbent inlet arranged to receive an input of sorbent for regeneration;
a sorbent outlet arranged to provide an output of regenerated sorbent;
one or more mass transfer regions arranged between the sorbent inlet and the sorbent outlet such that, in use, the sorbent is retained within the one or more mass transfer regions as the sorbent moves through the mass transfer regions and, in use, heating the sorbent to generate a gas occurs in the one or more mass transfer regions;
a first gas chamber; and
a second gas chamber, that is different from the first gas chamber;
wherein the first gas chamber, second gas chamber and one or more mass transfer regions are arranged such that, in use, there is a flow path for gas from the gas inlet to the gas outlet that comprises gas flowing from the first gas chamber into one of the one or more mass transfer regions, the gas then flowing from said one of the mass transfer regions into the second gas chamber and the gas then flowing from the second gas chamber back into said one of the mass transfer regions;
and wherein the gas capture system further comprises a gas circulation system for gas in the sorbent regeneration region, wherein the gas circulation system is arranged to:
supply gas output from a gas outlet of the sorbent regeneration region to a gas inlet of the sorbent regeneration region;
wherein the gas circulated by the gas circulation system for the sorbent regeneration region is carbon dioxide.

2. The gas capture system according to claim 1, wherein:
the number of mass transfer regions in the gas capture region is the same as the number of mass transfer regions in the sorbent regeneration region;
there are a plurality of mass transfer regions; and
the number of mass transfer regions is optionally between 2 and 20;
wherein the gas capture region and/or the sorbent regeneration region are provided by one or more substantially cuboid reactors;
wherein one or more of the mass transfer regions are substantially cuboid;
wherein each mass transfer region is a moving bed;
wherein each mass transfer region is arranged such that, in use, the flow path of the sorbent through each mass transfer region is vertically downwards;
wherein one or more of the mass transfer regions comprises sidewalls that separate the mass transfer region from a gas chamber;
wherein each of the sidewalls is configured such that, in use, gas is able to flow through the sidewall and substantially no sorbent can pass through the sidewall.

3. The gas capture system according to claim 1, wherein:
one or more gas ducts are provided between each two adjacent mass transfer regions;
each of the one or more gas ducts comprises a plurality of gas chambers, wherein the gas chambers in each of the one or more gas ducts are separated by one or more baffle plates that gas is unable to flow through; and the gas chambers in each gas duct are aligned vertically, with vertically adjacent gas chambers separated by a substantially horizontal baffle plate.

4. The gas capture system according to claim 1, further comprising a flow control mechanism at an end of each mass transfer region for controlling the rate at which sorbent can move through the mass transfer region, wherein the gas capture region comprises cooling tubes in one or more of the gas chambers, and, in use, the cooling tubes are arranged to cool gas in the gas chambers.

5. The gas capture system according to claim 1, wherein the sorbent regeneration region comprises a heat source for supplying heat to the sorbent regeneration region, wherein the heat source in the sorbent regeneration region receives heat from a heat source that is external from the gas capture system;
wherein the heat source that is external from the mass transfer system is optionally a catalytic combustor.

6. The gas capture system according to claim 1, wherein the gas capture system comprises:
a heating region comprising a heating system for heating sorbent in the heating region, one or more moving beds, one or more gas inlets, one or more gas outlets and one or more gas chambers, wherein, in use, the sorbent is retained within the one or more moving beds of the heating region when the sorbent moves between the sorbent outlet of the gas capture region and the sorbent inlet of the sorbent regeneration region; and
a cooling region comprising a cooling system for cooling sorbent in the cooling region, one or more moving beds, one or more gas inlets, one or more gas outlets and one or more gas chambers, wherein, in use, the one or more moving beds of the cooling region receive the sorbent output from the sorbent outlet of the sorbent regeneration region and, when in the cooling region, the sorbent is retained within the moving beds of the cooling region.

7. The gas capture system according to claim 6, further comprising:
one or more heat loops;
wherein the heating system comprises a first part of each heat loop arranged in one of the one or more gas chambers of the heating region; and
wherein the cooling system comprises a second part of each heat loop arranged in one of the one or more gas chambers of the cooling region;
wherein the gas capture system comprises a gas circulation system;
wherein the gas circulation system is arranged to:
supply gas output from the gas outlet of the heating region to the gas inlet of the cooling region; and
supply gas output from the gas outlet of the cooling region to the gas inlet of the heating region;
wherein the gas capture system comprises a first gas circulation system and a second gas circulation system;
wherein the first gas circulation system is arranged to supply gas output from the gas outlet of the heating region to the gas inlet of the heating region, and the second gas circulation supply gas output from the gas outlet of the cooling region to the gas inlet of the cooling region, wherein the gas circulated in each gas circulation system for a heating and/or cooling region comprises one or more of air, nitrogen, clean flue gas, hydrogen and an inert gas.

8. The gas capture system according to claim 6, wherein the gas capture region, heating region, sorbent regeneration region and cooling region are comprised by different parts of a single reactor.

9. The gas capture system according to claim 6, wherein the gas capture region is comprised by a first reactor; and
the heating region, sorbent regeneration region and cooling region are comprised by second reactor.

10. The gas capture system according to claim 6, wherein any two, any three or all of the gas capture region, heating region, sorbent regeneration region and cooling region are comprised by different reactors.

11. The gas capture system according to claim 6, further comprising:
a first barrier that substantially prevents direct gas flow from a gas chamber in the gas capture region to a gas chamber in the heating region;
a second barrier that substantially prevents direct gas flow from a gas chamber in the heating region to a gas chamber in the sorbent regeneration region; and
a third barrier that substantially prevents direct gas flow from a gas chamber in the sorbent regeneration region to a gas chamber in the cooling region.

12. The gas capture system according to claim 1, wherein, in use, the gas supplied through the gas inlet of the gas capture system comprises $CH_4$ and $H_2O$; and
a sorption enhanced reforming process is performed in the gas capture region;
wherein, in use, a sorption enhanced water gas shift process is performed in the gas capture region,
wherein the gas capture region comprises:
a first region in which a sorption enhanced reforming process is performed;
a second region in which a sorption enhanced water gas shift process is performed; and
one or more pipes for cooling sorbent;
wherein:
the first region comprises the gas inlet of the gas capture region;
the second region comprises the gas outlet of the gas capture region; and
the one or more pipes for cooling sorbent are arranged between the first region and the second region.

13. The gas capture system according to claim 12, wherein the one or more pipes for cooling sorbent are part of a heat exchanger arranged to transfer heat between a heating region and the gas capture region.

14. The gas capture system according to claim 12, wherein, in use, the gas capture region comprises a catalyst for accelerating the sorption enhanced reforming process and/or the sorption enhanced water gas shift process;
wherein, in use:
particles are circulated around the gas capture system with each particle comprising both the catalyst and the sorbent;
separate particles of sorbent and catalyst are circulated around the gas capture system; and/or
a fixed bed of catalyst is provided in the gas capture region.

15. The gas capture system according to claim 1, wherein the sorbent comprises a metal carbonate; and
in use, the gas captured in the gas capture region is carbon dioxide.

16. A power generation system comprising:
a power plant arranged to generate power by combusting a carbonaceous fuel; and
the gas capture system according to claim 1;
wherein the gas capture system is arranged to receive flue gas output from the power plant and remove carbon dioxide from the flue gas.

17. The power generation system according to claim 16, wherein the power plant is a natural gas combined cycle plant;
 wherein the power plant further comprises a heat exchanger for using heat generated in gas capture system to pre-heat air used in the power plant.

18. A method of separating a gas from a gas mixture, the method comprising:
 receiving a gas mixture by a gas capture system according to claim 1; and
 using the gas capture system to remove a gas from the gas mixture.

\* \* \* \* \*